United States Patent [19]
Yamada et al.

[11] Patent Number: 5,630,177
[45] Date of Patent: May 13, 1997

[54] DATA PRINT UNIT FOR NON-REMOVABLE-FILM CAMERA

[75] Inventors: Haruyoshi Yamada; Hiroshi Kobayashi; Masaki Ozawa; Seiji Tanaka, all of Suwa, Japan

[73] Assignee: Seiko Epson Corporation, Tokyo, Japan

[21] Appl. No.: 982,811

[22] PCT Filed: Apr. 1, 1992

[86] PCT No.: PCT/JP92/00419

§ 371 Date: Jan. 12, 1993

§ 102(e) Date: Jan. 12, 1993

[87] PCT Pub. No.: WO92/17815

PCT Pub. Date: Oct. 15, 1992

[30] Foreign Application Priority Data

| | | | |
|---|---|---|---|
| Apr. 2, 1991 | [JP] | Japan | 3-069980 |
| Apr. 25, 1991 | [JP] | Japan | 3-095685 |
| Apr. 25, 1991 | [JP] | Japan | 3-095686 |
| Apr. 25, 1991 | [JP] | Japan | 3-095705 |
| Apr. 25, 1991 | [JP] | Japan | 3-095706 |
| Dec. 10, 1991 | [JP] | Japan | 3-326000 |

[51] Int. Cl.⁶ ............................................ G03B 17/24
[52] U.S. Cl. ............................................ 396/6; 396/317
[58] Field of Search .............................. 354/105, 106, 354/109, 202, 288; 396/6, 317

[56] References Cited

U.S. PATENT DOCUMENTS

| | | | |
|---|---|---|---|
| 4,181,416 | 1/1980 | Ohtaki et al. | 354/106 |
| 4,265,526 | 5/1981 | Ueda et al. | 354/106 |
| 4,954,858 | 9/1990 | Ohmura et al. | 354/288 X |
| 5,436,685 | 7/1995 | Yamashina | 354/202 |

FOREIGN PATENT DOCUMENTS

| | | |
|---|---|---|
| 2331334 | 1/1975 | Germany. |
| 2458756 | 6/1976 | Germany. |
| 53-33617 | 3/1978 | Japan. |
| 54-13324 | 1/1979 | Japan. |
| 54-51524 | 4/1979 | Japan. |

*Primary Examiner*—Safet Metjahic
*Assistant Examiner*—J. K. Han
*Attorney, Agent, or Firm*—W. Glen Johnson

[57] ABSTRACT

In a data print unit (40), a lower frame (50) and an upper frame (60) are assembled into a single unit by retaining tabs, shafts (71) and (81) of a year-month data indicator wheel (70) and of a day data indicator wheel (80) are inserted from the outside surface of upper frame (60), and print data plates (75) and (85) are fixed to the ends of shafts (71) and (81) from the outside surface of lower frame 50 by press fitting flanged insertion pins (78) and (88). A light-emitting diode (91) and a reflecting mirror that reflects the light beam emitted from light-emitting diode (91) and projects it on the rear surface of the film via light transmission holes (53a) and (53b) are built into the sandwich structure of lower frame (50) and upper frame (60). Translucent year-month data sections are formed on data plate (75) and translucent day data sections are formed on data plate (85). The year-month data indicator wheel (70) and data plate (75) can be replaced without separating the relatively high cost assembled unit, and the data plate can be attached and removed relatively easily.

25 Claims, 33 Drawing Sheets

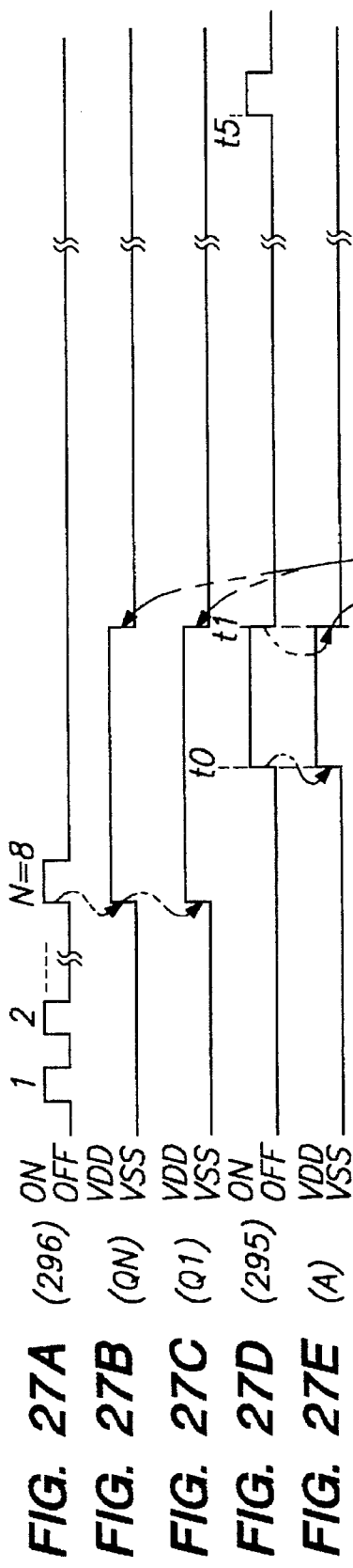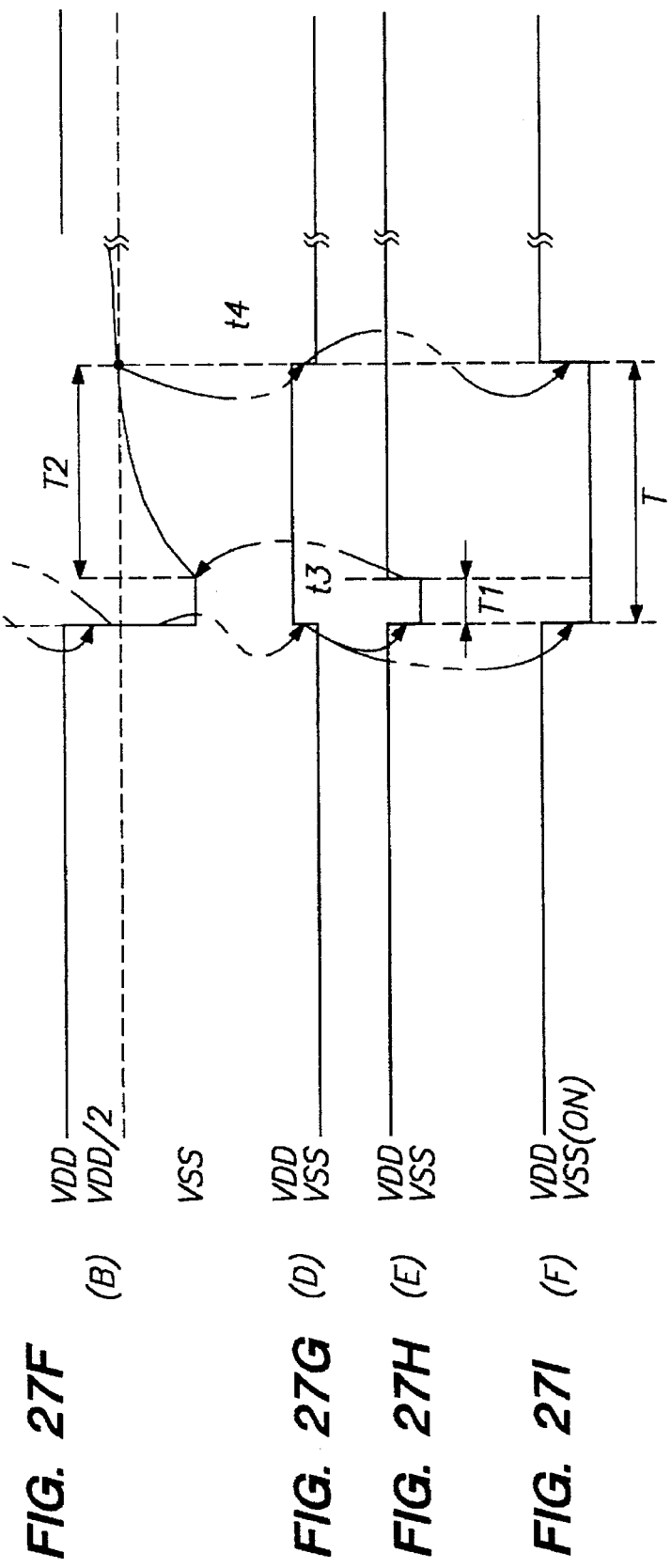
FIG. 27A (296)
FIG. 27B (QN)
FIG. 27C (Q1)
FIG. 27D (295)
FIG. 27E (A)
FIG. 27F (B)
FIG. 27G (D)
FIG. 27H (E)
FIG. 27I (F)

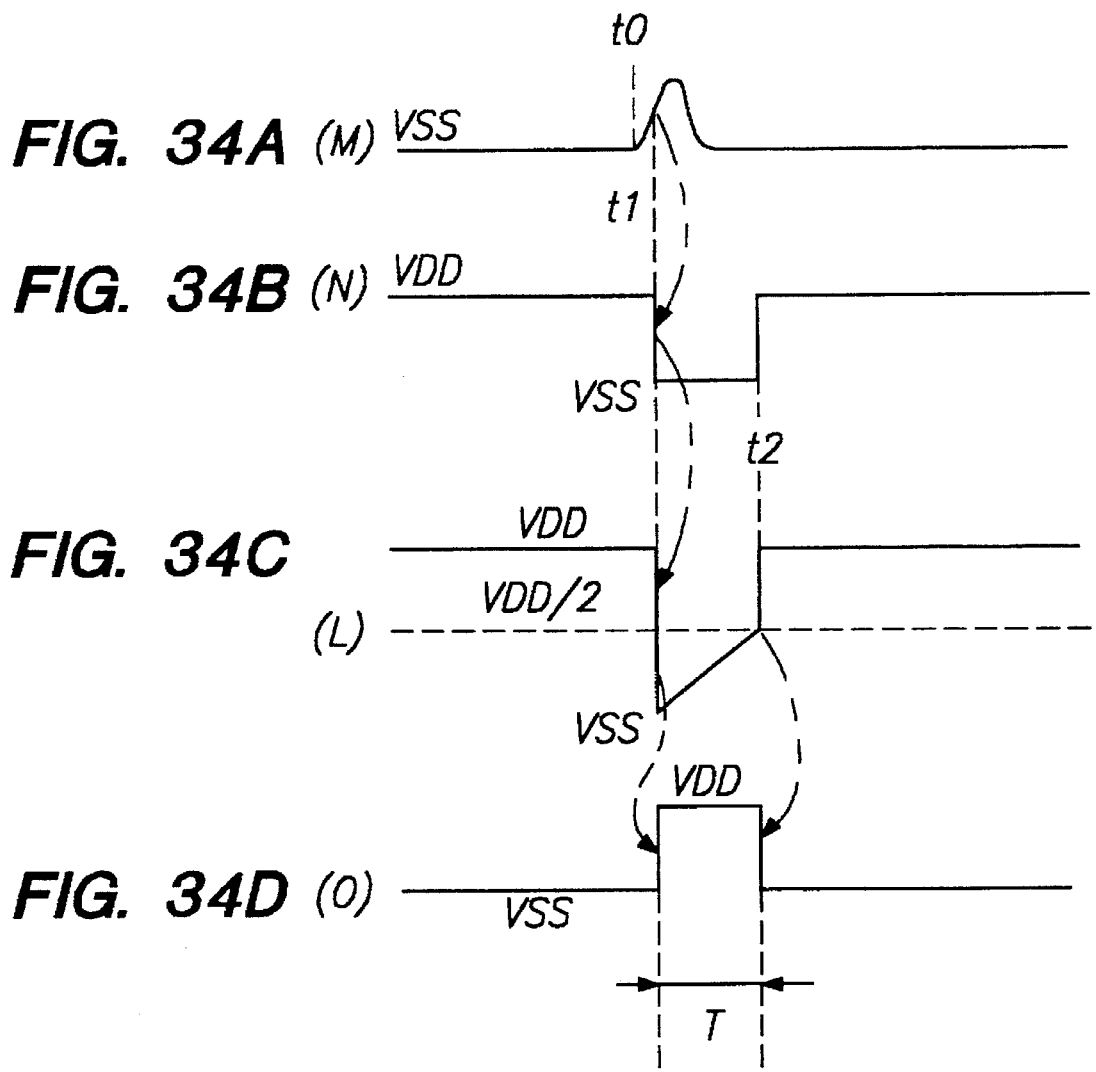

DATA PRINT UNIT FOR NON-REMOVABLE-FILM CAMERA

BACKGROUND OF THE INVENTION

1. Field of the Invention

The present invention relates to data print units that print data such as the year, month and day on photographic film, and more particularly it relates to simple, inexpensive, compact data print units applicable to simple non-removable-film cameras generally referred to as throw-away cameras or one-time-use cameras.

2. Related Art

Non-removable-film cameras, comprise one roll of film already loaded in the case, a simple manual film advance mechanism, a simple manual shutter mechanism and a photo lens and do not have a film exchange mechanism that can be easily operated by the user himself. Therefore, their configuration allows only the prescribed number of photographs for the photographic film and does not allow the user himself to replace the photographic film. These non-removable-film cameras can be purchased inexpensively for a price only slightly higher than the single-unit price of the photographic film. For this reason, they can be referred to as "lens-equipped film." This makes them easy to use when you do not have your own camera on trips or at events. Some of these non-removable-film cameras are equipped with a flash device as in regular cameras, but there are none with a data print device that prints data such as the year, month and day on the film. There is a limit to the number of pictures a non-removable-film camera can take, and the period during which they can be used is also limited, but there is a strong demand to be able to leave data on each photograph to facilitate their arrangement.

There are many cameras such as 35 mm twin lens reflex and single lens reflex cameras that are equipped with a data print device (camera module). This data print device is mounted behind a photographic film 2 inside a back cover 1 of the camera as shown in FIG. 36, for example, and it exposes the year-month-day data number string on the back of photographic film 2. The data print device comprises a resin case that is approximately 3 cm square and 3 mm thick, a photodiode or tungsten lamp housed inside the resin case as a light source 3a, a reflecting mirror 3b that reflects the light beam, which is emitted from light source 3a and travels along the surface of the case, at a right angle so that it is deflected in the direction of the thickness of the case, a transmission type liquid crystal display element 3c illuminated by the reflected light, and a shielding plate 3d that restricts the illumination on the display element, whereby the transmitted light formed in the shape of a data number string by the transmission type liquid crystal display element 3c is projected on the rear surface of photographic film 2 as parallel beams of light. The print data number string is formed by freely changing the multiple-digit number for the year-month-day displayed on the transmission type liquid crystal display element 3c by changing the data signal of the liquid crystal driver by an external operation, and therefore there is no restriction on the year-month-day data that is printed.

It is possible to apply such a data print device (unit module) for cameras to non-removable-film cameras, but the high cost of the transmission type liquid crystal element 3c, driver IC and other electronic parts would nullify the cost advantages of non-removable-film cameras. Therefore, a data print device that can be practically used with non-removable-film cameras must be simple and inexpensive.

Since the function of transmission type liquid crystal display element 3c is to shape the illumination light into the form of data light and project it, the inventors realized that a print data plate with translucent year-month-day data sections, for example, could be used instead of this transmission type liquid crystal display element and proposed a configuration in which the appropriate print data number could be selected by manually turning the data plate.

In this case, the restricted surface area naturally limits the amount of data in the data sections (year-month-day) that can be displayed on the print data plate, but since there need only be sufficient data for the limited period during which the non-removable-film camera can be used, it is only necessary to be able to select year-month-day data for a fixed period. However, it is necessary to mount a print data plate with updated data in print devices for differing use periods. Therefore, the print device must have a structure that facilitates attachment and removal of the data plate.

However, even if a simple, inexpensive configuration is realized by employing a data print device equipped with a print data plate, the structure of the non-removable-film camera, which is the main unit, requires that this device have a compact configuration (e.g., approximately 3 cm square and 3 mm thick).

Although conventional print devices allow electronic static operation of data selection, since the print data plate is movable, a configuration must be used that sufficiently considers play, etc., of the print data plate. This is because if the print data plate should rotate eccentrically, have play or become warped, the transmitted light that passes through the data sections will become diffused, resulting in deformation, dropout or fuzziness of the data numbers exposed on the film, thus degrading exposure quality. In spite of this problem with exposure quality, a data selection mechanism is necessary in the data print devices that use this kind of movable mechanism. That is, the selection of a specific data section requires that the print data plate be rotated to a specific position and that it be held stationary at that position.

For the purpose of realizing a low-cost, compact data print device suitable for non-removable-film cameras, the first objective of the invention is to offer a data print device that facilitates the attachment and removal of the print data plate, the second objective is to realize a structure that prevents eccentric rotation, play or warping of the print data plate, and the third objective is to realize a data selection mechanism suitable to the print unit.

SUMMARY OF THE INVENTION

The principal component parts making up the data print unit of the invention are an upper frame, a lower frame, a light source, an optical means, a print data plate, and a data indicator wheel. The light source is built into an assembled unit in which the upper frame and lower frame are mated together. The optical means projects the light emitted from the light source to the outside via a light transmission hole in the lower frame. The print data plate has multiple translucent type or shielding type data sections at positions equidistant from its rotational center. Further, the data indicator wheel has a flange with data indicator sections corresponding directly or indirectly to the data sections on the print data plate at positions equidistant from its rotational center. The present invention employs such component elements as these, and a sandwich structure is employed as their assembled structure. That is, the data indicator wheel is positioned on the outside surface of the upper frame and can be rotated with respect to the assembled unit, and the print data plate is positioned on the outside surface of the lower frame such that each data section selectively faces the light transmission hole and is fixed to the data indicator wheel such that it can be removed and attached. As a specific mode of connection of the print data plate to the data indicator wheel, the data indicator wheel structure includes an axial member that passes through an axial hole in the assembled unit and the print data plate is fixed to the end of the axial member by means of a flanged pin, etc. The operation that selects data on the print data plate can be performed by manually rotating the data indicator wheel and fine adjusting it to line up the data, but the invention employs a data selection mechanism that reliably rotates and stops the data plate. That is, the data selection mechanism comprises a ratchet gear formed on the back surface of the flange of the data indicator wheel and a damping member that meshes with the ratchet gear formed on the upper frame. Here, it is desirable that an inclined surface be formed on either the ratchet gear or the damping member such that it moves the upper frame and data indicator wheel to a meshed condition at the same time they are assembled. Further, it is desirable that the data indicator wheel have a groove on its inner circumference between the axial member and the ratchet gear and that the upper frame have a cylindrical member on the edge of the opening of its axial hole that engages with the groove on the inner circumference. It is also desirable that the position where they mesh be near the light transmission hole.

The print data plate is not limited to one, and multiple plates may be used. In cases in which the space occupied by the data sections is relatively small, only one print data plate may be necessary, but if different types of data are to be printed, a different data plate for each should be used. However, in cases in which three or more data plates are used, it is difficult to arrange multiple data sections within the single illumination range of one light source. That is because the data indicator wheels have a one-to-one relationship with the data plates and it is necessary to secure sufficient area for the flange member of the data indicator wheels. Actually, the print data plates are made up of a disk-shaped first print data plate and a disk-shaped second print data plate. Also, the data indicator wheels are made up of a first data indicator wheel corresponding to the first print data plate and a second data indicator wheel corresponding to the second print data plate. In this case, it is desirable to position the first print data plate and the second print data plate so parts of each overlap and to provide a light transmission hole facing the overlapping parts. Further, in a case in which the data sections are translucent, it is desirable that the first light transmission hole facing the data sections of the first print data plate and the second light transmission hole facing the data sections of the second print data plate be used as the light transmission holes and that the first light transmission hole and the second light transmission hole be separated by a shielding partition. In a case such as this in which two data plates are used to print year-month-day data, it is desirable to provide the year-month data on the first print data plate and the day data on the second print data plate. In addition, it is desirable to provide an opaque non-data section on both the first and second print data plates.

In a case in which a data print unit with the sandwich structure is applied to a non-removable-film camera, the camera body has a structure that allows attachment of the data print unit and a data light transmission hole is formed in it, and a mechanical switch is provided that is linked to the exposure action of the shutter blade and closes the illumination control circuit of the light source. It is desirable that the illumination control circuit be a timed feeder circuit that fixes the time power is supplied to the light source by closing of the mechanical switching means in the data print unit. It is desirable that a battery be provided in the data print unit for supplying power to the light source.

In the configuration that links the print operation to the shutter blade, it is necessary to provide a mechanical switching means in the camera body that detects the movement of the shutter blade. The data print unit is provided with following circuitry while employing the sandwich structure in order to avoid as much as possible any increase in the number of parts or design changes in the camera body being given a data print function. That is, it is equipped with a manual switching means as the light source illumination control circuit that generates an illumination command signal to control illumination by the light source, a detection means that detects the completion of film advance and generates a detection signal, a means that stores the completed or uncompleted condition of film advance according to the detection signal, a timed feeder circuit that fixes the time period during which power is fed to the light source from the built-in battery at the time the detection signal is generated upon the completion of film advance, and a double-illumination prevention circuit that prevents power from being supplied to the light source when film advance is not completed. Here, the detection means can be a mechanical switching means that is opened and closed by a spring member that enters the perforations and moves up and down with the advance of the photographic film. When employing a data print unit with this configuration, the structure of the camera body need only be provided with a data light transmission hole to facilitate attachment of the data print unit.

In addition to automatic printing linked to the action of the shutter blade or manual printing after completion of film advance, a part of the projected light introduced inside the camera body can be utilized for print timing. That is, the data print unit that utilizes the sandwich structure employs a photosensor facing the sensing light transmission member of the lower frame and a timed feeder circuit that fixes the time period during which power is supplied to the light source from the built-in battery at the time the detection signal is generated by the sensor. The structure of the camera body to which the data print unit with the above configuration is applied has a data light transmission hole and a light path that guides part of the projected light to the sensor. A projected light path formed by using the perforation holes in the photographic film or a light transmission hole formed in the back case of the camera body at a position within the angle of view of the photographic film may be used as the light path. Further, the light path can also be a dedicated light path formed outside the area occupied by the photographic film.

The invention comprises an assembled unit having a first sandwich structure in which the light source and the optical means are sandwiched between the upper frame and lower frame and a structure in which this assembled unit is sandwiched between the data indicator wheel and the print data plate. Therefore, it is extremely easy to assemble and to exchange parts. Particularly since the print data plate is positioned on the outside of the lower frame and the data indicator wheel is positioned on the outside of the upper frame, it is possible to replace the print data plate and the data indicator wheel without disassembling the assembled unit made up of the two frames, thereby facilitating reuse of the relatively expensive assembled unit. The print data plate is configured such that it is fixed directly to the data indicator wheel and does not have a rotation transmission mechanism. Therefore, not only are the number of parts reduced, the occurrence of transmission play when a rotation transmission mechanism is used does not become problem, and the data to be printed can be accurately selected. Further, since a data selection mechanism made up of a ratchet gear and damping member is used, it is possible to manually rotate and stop the data indicator wheel accurately in equal degree intervals and always line up the data sections and light transmission hole. Therefore, there is no deformation or dropout of the printed data and the quality of the data exposure can be improved though data printing is performed by manual operation. When an inclined surface is formed on either the ratchet gear or the damping member such that it moves these parts to a meshed condition when the upper frame and data indicator wheel are assembled, the ratchet gear and damping member are guided by the inclined surface in the assembly operation and mesh themselves, thus eliminating the need for a special operation to cause the two to mesh. Since a groove is formed on the inside circumference of the data indicator wheel and a cylindrical member that engages this inside groove is formed on the upper frame, the length of bearing support is the same as the depth of the inside groove. This helps inhibit play between the axial member and the axial hole and makes it possible to suppress play in the data sections of the print data wheel, thereby improving print quality. Further, when those parts of the ratchet gear and damping member that mesh are near the light transmission hole, shift, etc., of the data section to be printed is affected little by mesh play, thus making it possible to suppress deformation of the printed data.

When two print data plates are used, the year-month-day data sections can be affixed to the two data plates while realizing a compact configuration suitable for attachment to a non-removable-film camera. In this case, the year-month data sections can be affixed to one print data plate and the day data sections can be affixed to the other print data plate, and any year-month-day data can be updated by changing only the data plate with the year-month data sections and its indicator wheel. By positioning the first print data plate and second print data plate so that they partially overlap, the printing of light other than that transmitted by the data sections can be prevented. Further, when the first light transmission hole and second light transmission hole are separated by a shielding partition, any light other than that transmitted by the data sections can be shielded by the shielding partition. Also, when a non-data section is formed in the data plate, photographs can be obtained with no printed data.

In the case of a configuration having a mechanical switching means that closes the illumination control circuit for the light source in conjunction with the exposure operation of the shutter of the camera body, data can be automatically printed by the photographic operation. Also, in a configuration equipped with a timed feeder circuit that fixes the time period during which power is fed to the light source in the data print unit according to the closing of the mechanical switching means, data exposure is achieved for a fixed period of time regardless of the speed with which the shutter moves up and deviations in print quality (amount of exposure) with each photograph taken can be eliminated. Further, when there is a power supply battery for the light source in the assembled data print unit, it is possible to perform a print test in advance using only the data print unit, thus contributing to reliability testing.

When the manual switching means is not operated in a configuration that is equipped with a manual switching means as the light source illumination control circuit that generates an illumination instruction signal to control illumination by the light source, a detection means that detects the completion of film advance and generates a detection signal, a means that stores the completed or uncompleted condition of film advance according to the detection signal, a timed feeder circuit that fixes the time period during which power is fed to the light source from the built-in battery at the time the detection signal is generated upon the completion of film advance, and a double illumination prevention circuit that prevents power from being supplied to the light source when film advance is not completed, the data printing operation is not executed. This does not require that the non-data section of the data plate be selected on the data indicator wheel when the printing of data is not performed. Also, since data are not printed when film advance has not been completed, double printing can be prevented.

When a configuration is employed having a photosensor facing the sensing light transmission member of the lower frame and a timed feeder circuit that fixes the time period during which power is supplied to the light source from the built-in battery at the time the detection signal is generated by the sensor, the configuration of the light source illumination control circuit can be simplified. Particularly when a projected light path formed in the camera body by utilizing the perforations in the photographic film is used as the light path that guides part of the projected light to the sensor, the amount of light received by the sensor is relatively great and design changes in the camera body can be minimized.

The invention comprises a light source housed in the space inside the assembled unit formed by mating the upper frame and lower frame, an optical means that projects the light beam emitted from the light source to the outside via the light transmission hole in the lower frame, a print data plate with multiple translucent and shielding type data sections at positions equidistant from its rotational center, and a data indicator wheel with a flange to which data indicator sections are affixed corresponding directly or indirectly to the data sections on the print data plate at positions equidistant from its rotational center, wherein the data indicator wheel is positioned on the outside surface of the upper frame and can be rotated with respect to the assembled unit, the print data plate is positioned on the outside surface of the lower frame such that each data section selectively faces the light transmission hole and is fixed to the data indicator wheel such that it can be removed and attached, and a first sandwich structure in which the light source and the optical means are sandwiched between the upper frame and lower frame of the assembled unit and a structure in which this assembled unit is sandwiched between the data indicator wheel and the print data plate are used. This configuration offers the following advantages.

1. Assembly and replacement of parts can be performed easily. It is particularly easy to replace the print data plate and the data indicator wheel without disassembling the assembled unit, thus making it possible to reuse the assembled unit. Further, since no special rotation transmission mechanism is used, not only can the number of parts be reduced, but transmission play does not become a problem and the data to be printed can be accurately selected.

2. Since a data selection mechanism made up of a ratchet gear and damping member is used, it is possible to manually rotate and stop the data indicator wheel accurately in equal degree intervals and always line up the data sections and light transmission hole. Therefore, there is no dropout of the printed data and the quality of the data exposure can be improved though data printing is performed by manual operation.

3. Since a groove is formed on the inside circumference of the data indicator wheel and a cylindrical member that engages this inside groove is formed on the upper frame, the length of bearing support is the same as the depth of the inside groove. This helps inhibit play between the axial member and the axial hole and makes it possible to suppress play in the data sections of the print data wheel, thereby improving print quality.

4. When those parts of the ratchet gear and damping member that mesh are near the light transmission hole, shift, etc., of the data section to be printed is affected little by mesh play, thus making it possible to suppress deformation of the printed data. Here, when an inclined surface is formed on either the ratchet gear or the damping member such that it moves these parts to a meshed condition when the upper frame and data indicator wheel are assembled, the ratchet gear and damping member are guided by the inclined surface in the assembly operation and mesh themselves, thus eliminating the need for a special operation to cause the two to mesh.

5. When two print data plates are used, the year-month-day data sections can be affixed to the two data plates while realizing a compact configuration suitable for attachment to a non-removable-film camera. In this case, the year-month data sections can be affixed to one print data plate and the day data sections can be affixed to the other print data plate, and any year-month-day data can be updated by changing only the data plate with the year-month data sections.

6. By positioning the first print data plate and second print data plate so that they partially overlap, the printing of light other than that transmitted by the data sections can be prevented.

7. When the first light transmission hole and second light transmission hole are separated by a shielding partition, any light other than that transmitted by the data sections can be blocked by the shielding partition.

8. When a non-data section is formed in the data plate, photographs can be obtained with no printed data.

9. In the case of a configuration having a mechanical switching means that closes the illumination control circuit of the light source in conjunction with the exposure operation of the shutter of the camera body, data can be automatically printed. Also, in a configuration equipped with a timed feeder circuit that fixes the time period during which power is fed to the light source according to the closing of the mechanical switching means in the data print unit, data exposure is achieved for a fixed period of time regardless of the speed with which the shutter moves up and deviations in print quality with each photograph taken can be eliminated. Further, when there is a power supply battery for the light source in the data print unit, it is possible to perform a print test in advance using only the data print unit.

10. When the manual switching means is not operated in a configuration that is equipped with a manual switching means as the light source illumination control circuit that generates an illumination instruction signal to control illumination by the light source, a detection means that detects the completion of film advance and generates a detection signal, a means that stores the completed or uncompleted condition of film advance according to the detection signal, a timed feeder circuit that fixes the time period during which power is fed to the light source from the built-in battery at the time the detection signal is generated upon the completion of film advance, and a double illumination prevention circuit that prevents power from being supplied to the light source when film advance is not completed, the data printing operation is not executed. This means that the data indicator wheel need not be turned when the printing of data is not performed. Also, since data are not printed when film advance has not been completed, double printing can be prevented.

11. When a configuration is employed having a photosensor facing the sensing light transmission member of the lower frame and a timed feeder circuit that fixes the time period during which power is supplied to the light source from the built-in battery at the time the detection signal is generated by the sensor, the configuration of the light source illumination control circuit can be simplified.

12. Particularly when a projected light path formed in the camera body by utilizing the perforations in the photographic film is used as the light path that guides part of the projected light to the sensor, the amount of light received by the sensor is relatively great and design changes in the camera body can be minimized.

Other objects, advantages and attainments together with a fuller understanding of the invention will become apparent and appreciated by referring to the following description and claims taken in conjunction with the accompanying drawings.

BRIEF DESCRIPTION OF THE DRAWINGS

FIGS. 27A–27I depict a timing chart for explaining the operation of the same light source illumination control circuit.

FIGS. 34A–34D is a timing chart for explaining the operation of the same light source illumination control circuit.

DETAILED DESCRIPTION OF THE INVENTION

Figure 1:
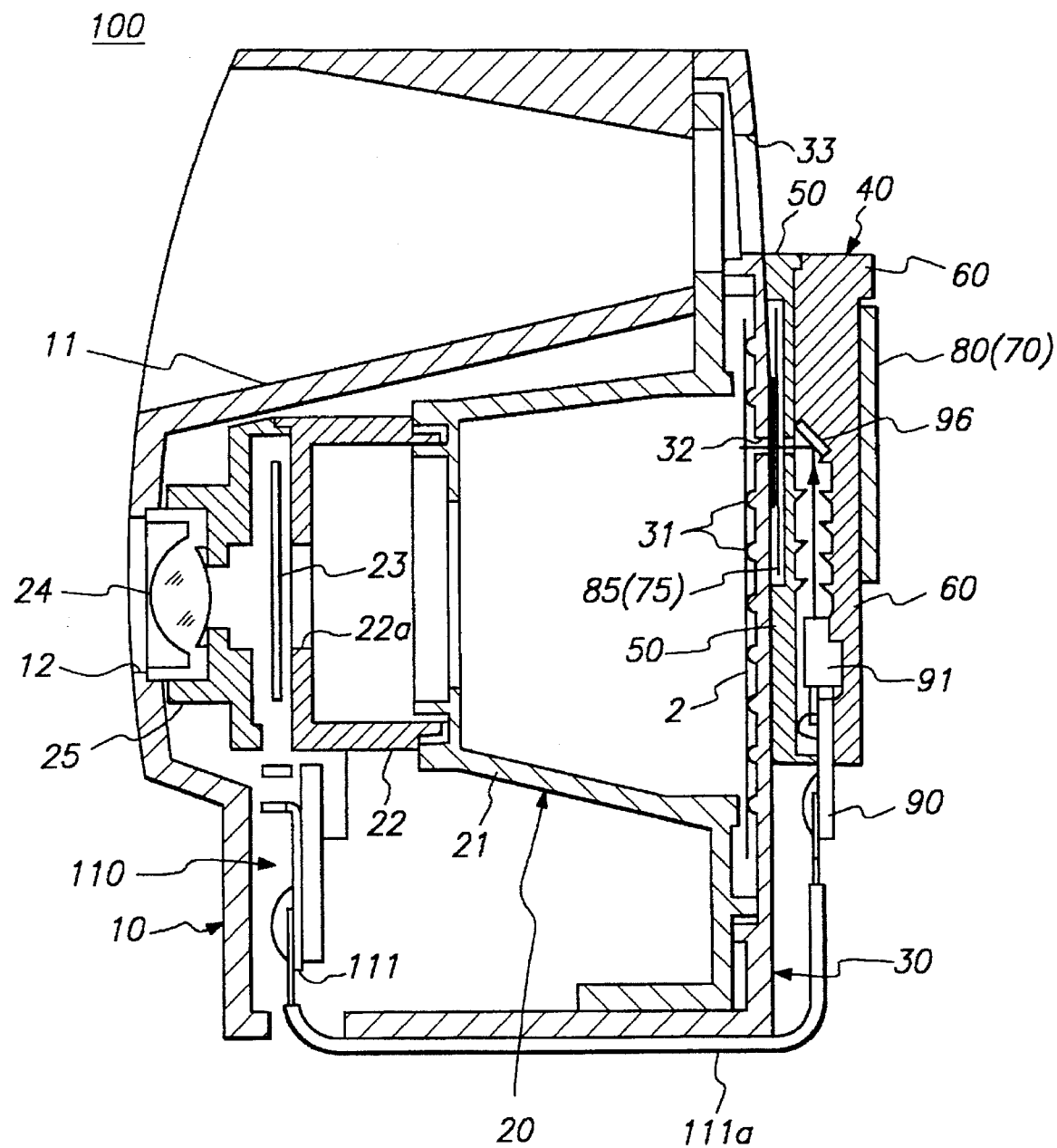
FIG. 1 is a longitudinal sectional side view showing a non-removable-film camera equipped with the data print unit of the first embodiment of the invention.
Figure 2:
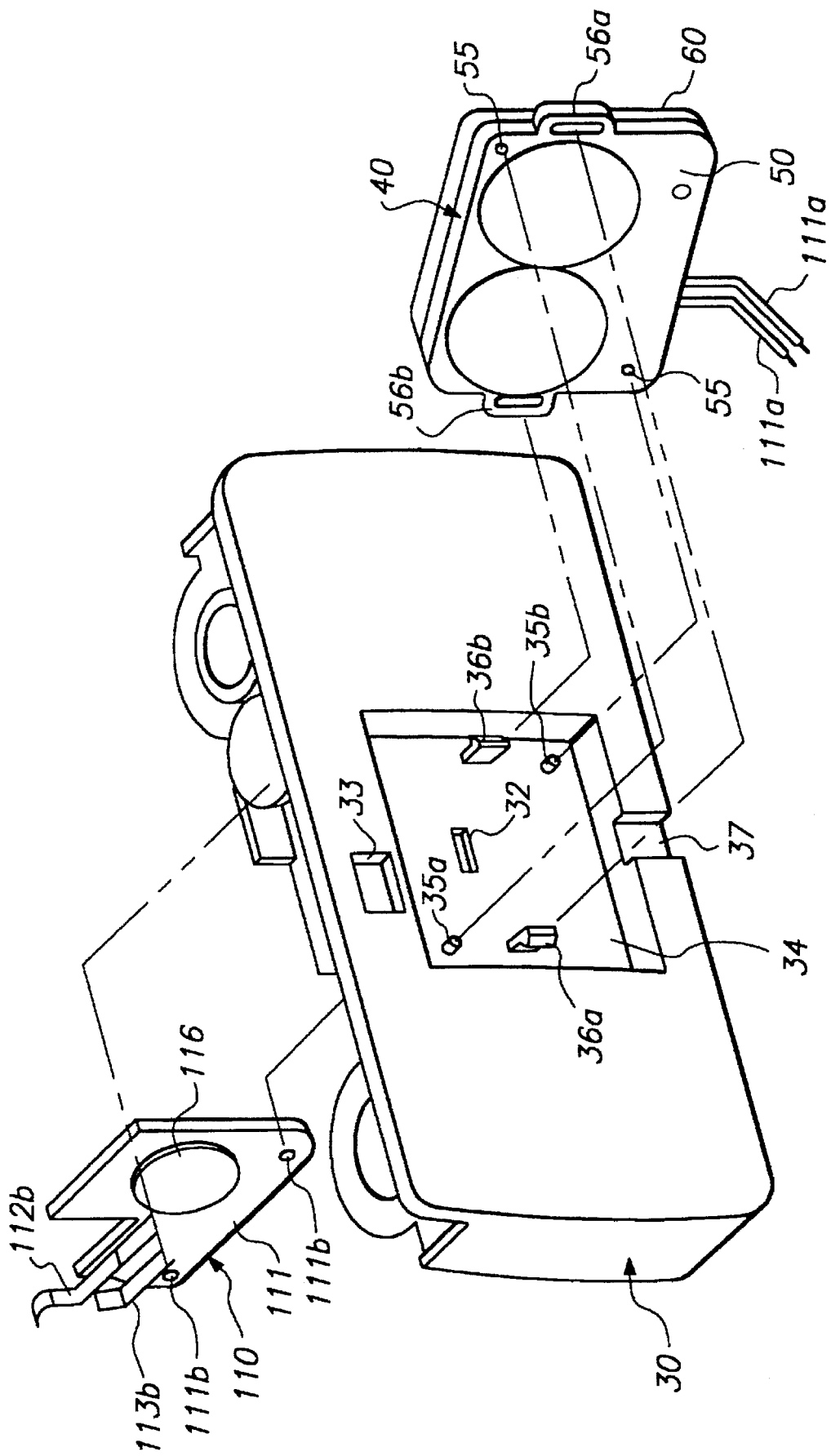
FIG. 2 is an exploded perspective view showing the camera body of the same non-removable-film camera with its front case removed and the data print unit.

FIG. 1 is a longitudinal sectional side view showing a non-removable-film camera equipped with the data print unit of the first embodiment of the invention, and FIG. 2 is an exploded perspective view showing the camera body of the same non-removable-film camera with its front case removed, the data print unit and the switch unit.

The case structure of this non-removable-film camera 100 comprises a resin front case 10, a resin middle case 20 and a resin back case 30, all three of which are assembled together into a single unit by being fitted together. Front case 10 is equipped with the finder hole 11, the lens opening 12, etc. Middle case 20 has a light guide cylinder 21 that restricts the projected light path and projects the subject light within a prescribed projection surface size on photographic film 2. Back case 30 is equipped with multiple protrusion s 31 extending in the direction of advance of photographic film 2, a data light transmission hole 32, a finder window 33, etc. A light guide frame 22 is fixed on light guide cylinder 21 by means of retainer tabs. A shutter blade 23 capable of rotating out is disposed in front of transmission light hole 22a formed in light guide frame 22. Also, a lens frame 25 holding a photographic lens 24 is fixed by means of retainer tabs to light guide frame 22 and in front of shutter blade 23.

A compact (3 cm square and 3 mm thick) data print unit 40 is attached to the outside of back case 30 such that it can be attached and removed. Data print unit 40 is essentially an assembled structure in which the necessary parts are sandwiched between a black resin lower frame (lower case) 50 and a black resin upper frame (upper case) 60, with data indicator wheels 70, 80 and print data plates 75, 85 attached to the outside surface. A circuit board 90 protruding out from the bottom end of data print unit 40 and a substrate 111 of a switch unit 110 positioned near shutter blade 23 are connected by lead wires 111a, 111a for power supply. Non-removable-film camera 100 is generally covered by a decorative paper box as an outer case (not shown) with holes in it for the front parts of photo lens 24, finder hole 11 and other important parts.

As shown in FIG. 2, a recessed rectangular unit holding space 34 is formed in back case 30, and dowels 35a, 35b are formed at a pair of opposing corners of this unit holding space 34. Also, retaining tabs 36a, 36b are formed on the right and left sides of unit holding space 34. Further, a groove 37 for leading out lead wires 111a, 111a is formed on the bottom edge of unit holding space 34.

Figure 3:
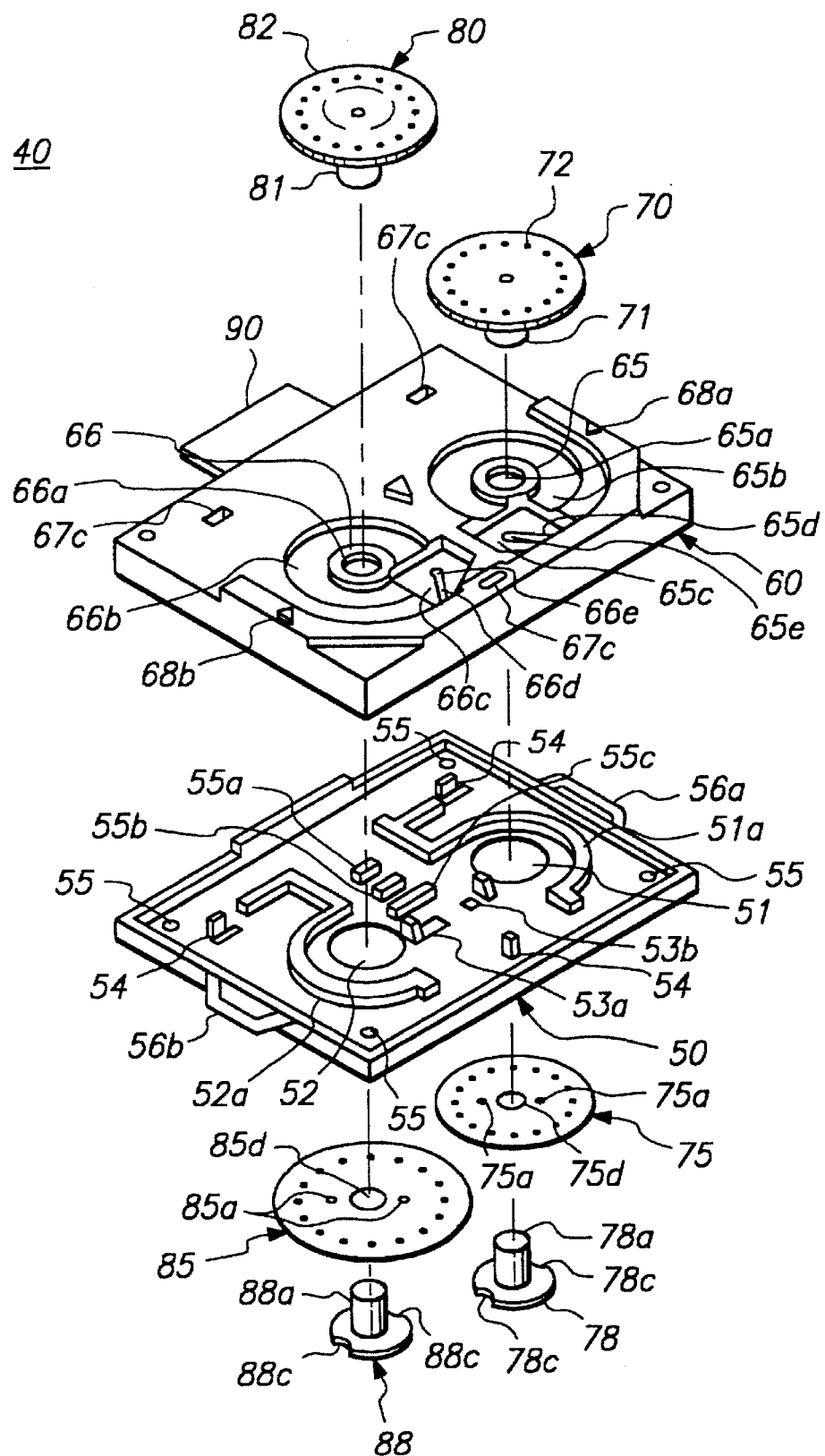
FIG. 3 is an exploded perspective view showing the same data print unit as seen from the top frame.
Figure 4:
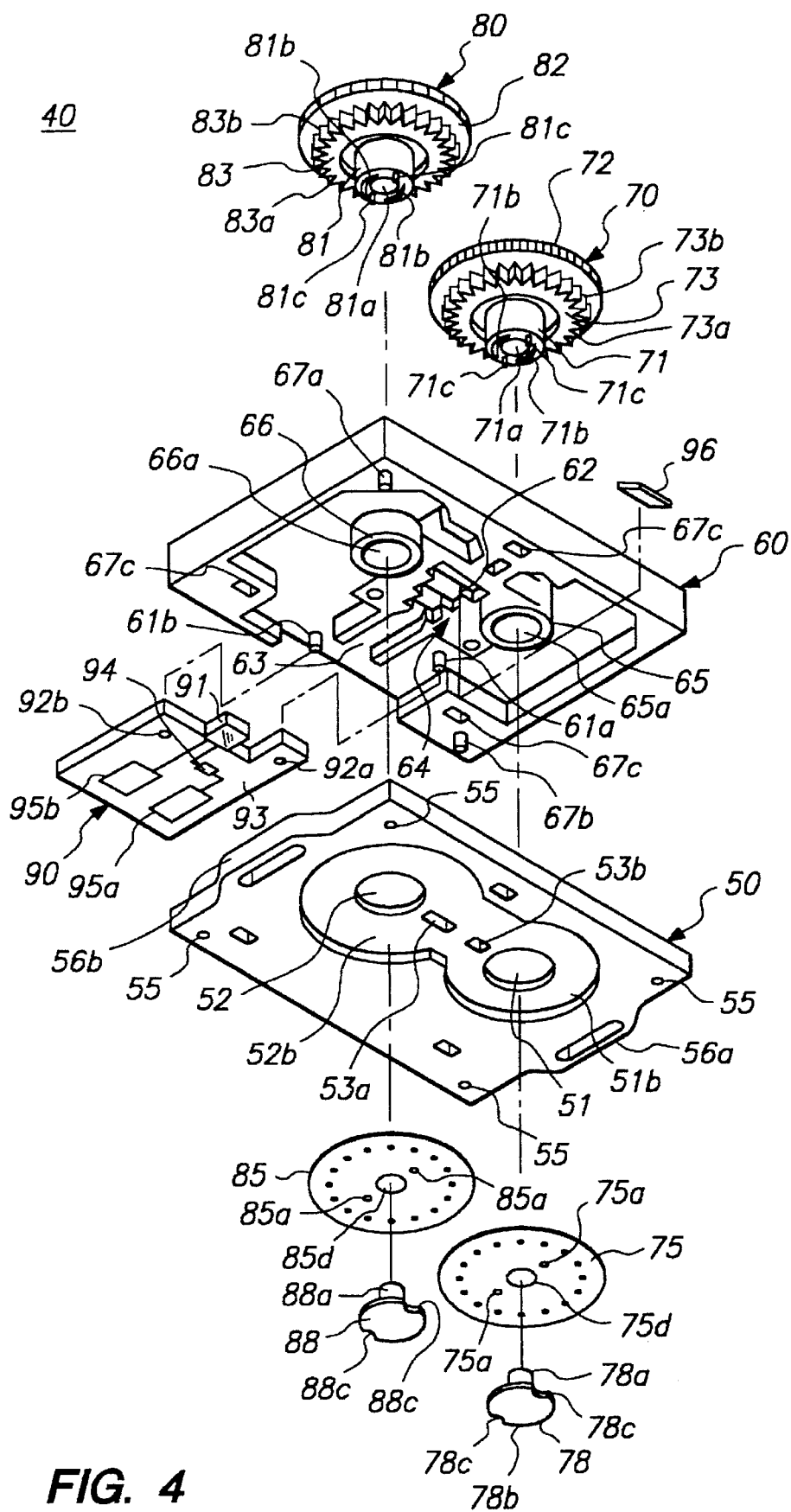
FIG. 4 is an exploded perspective view showing the same data print unit as seen from the bottom frame.
Figure 5:
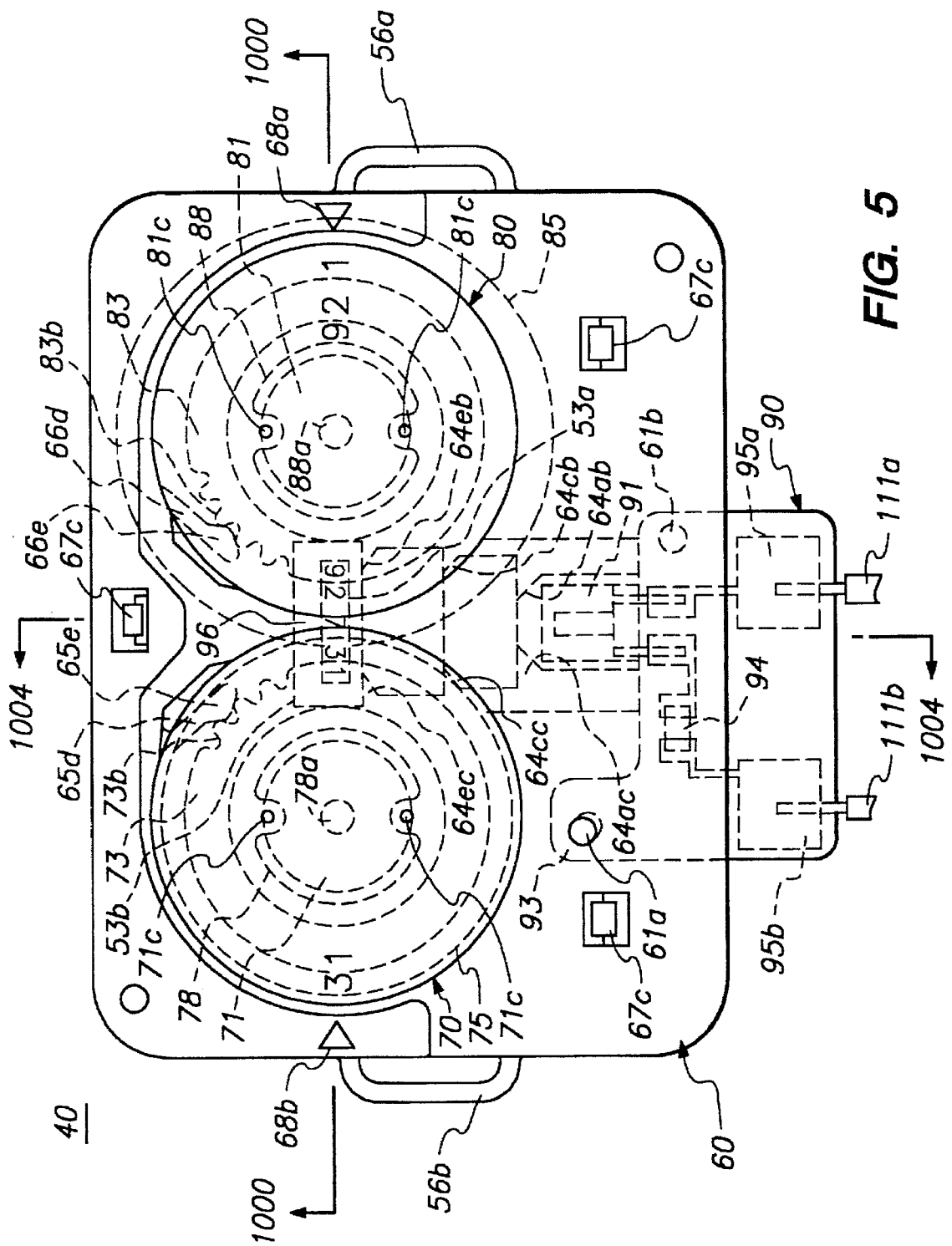
FIG. 5 is a plane view showing the same data print unit as seen from the upper frame.
Figure 6:
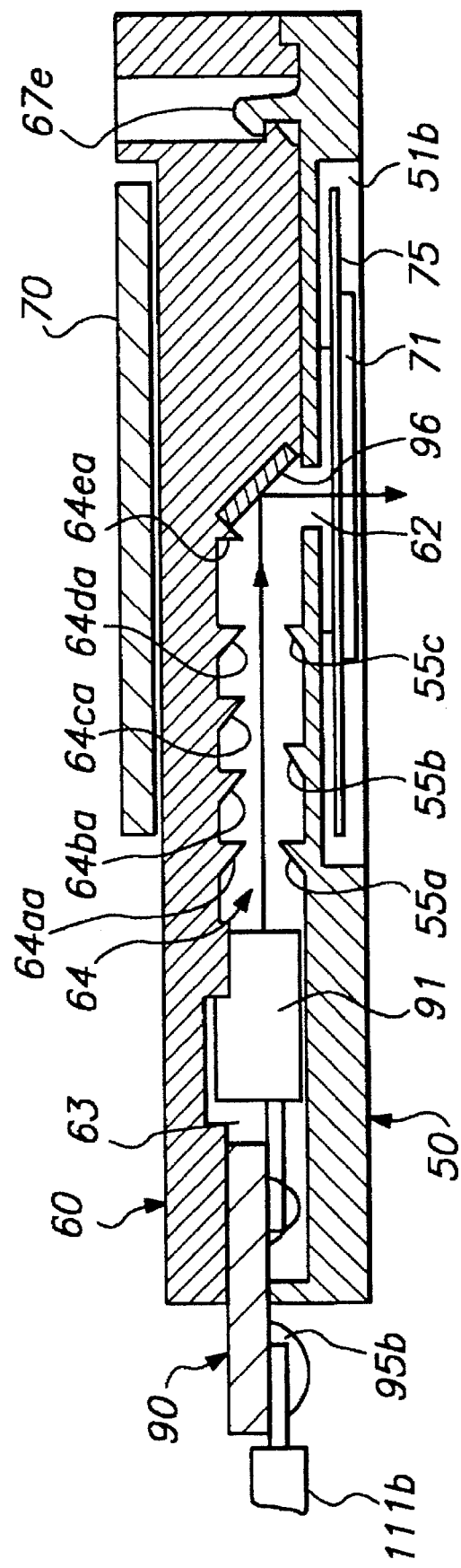
FIG. 6 is a cut plane view showing the cut plane along line 1004 in FIG. 5.
Figure 7:
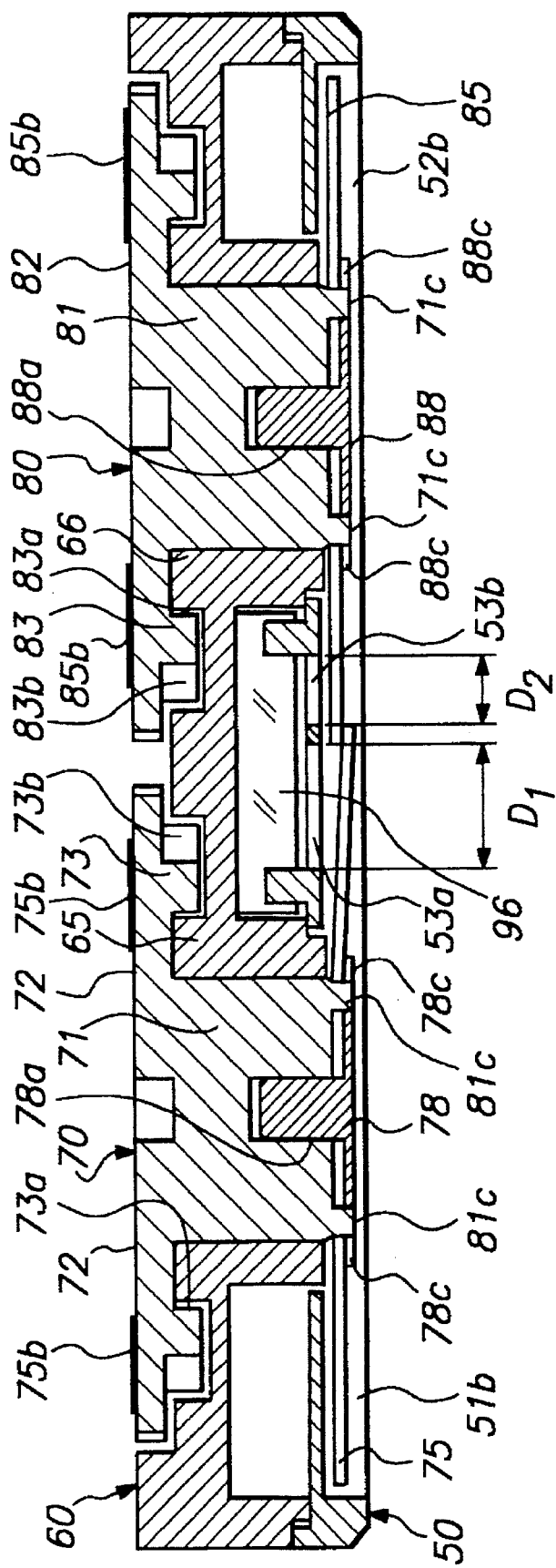
FIG. 7 is a cut plane view showing the cut plane along line 1000 in FIG. 5.
Figure 8:
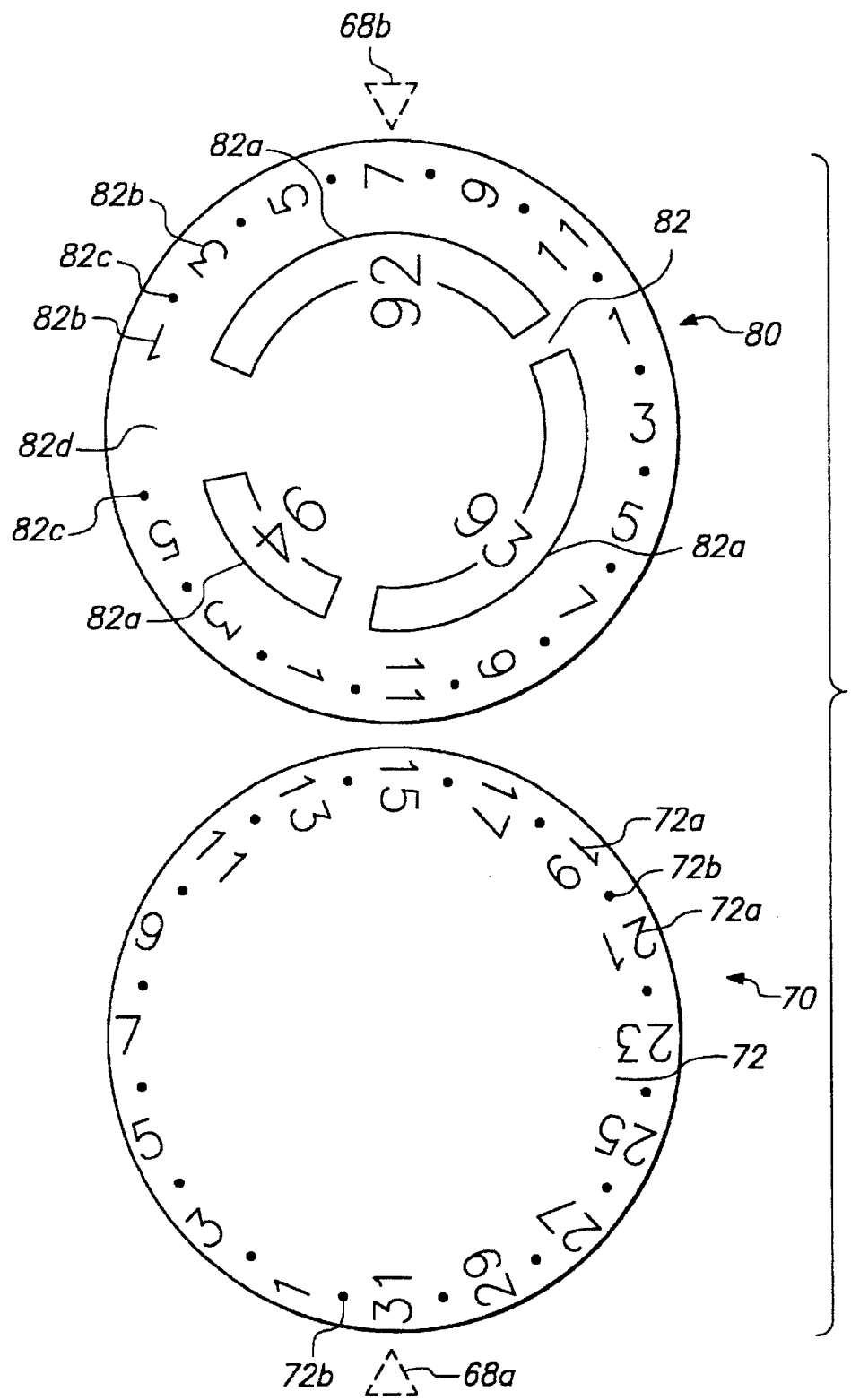
FIG. 8 is a plane view showing the two data indicator wheels in the same data print unit.
Figure 9:
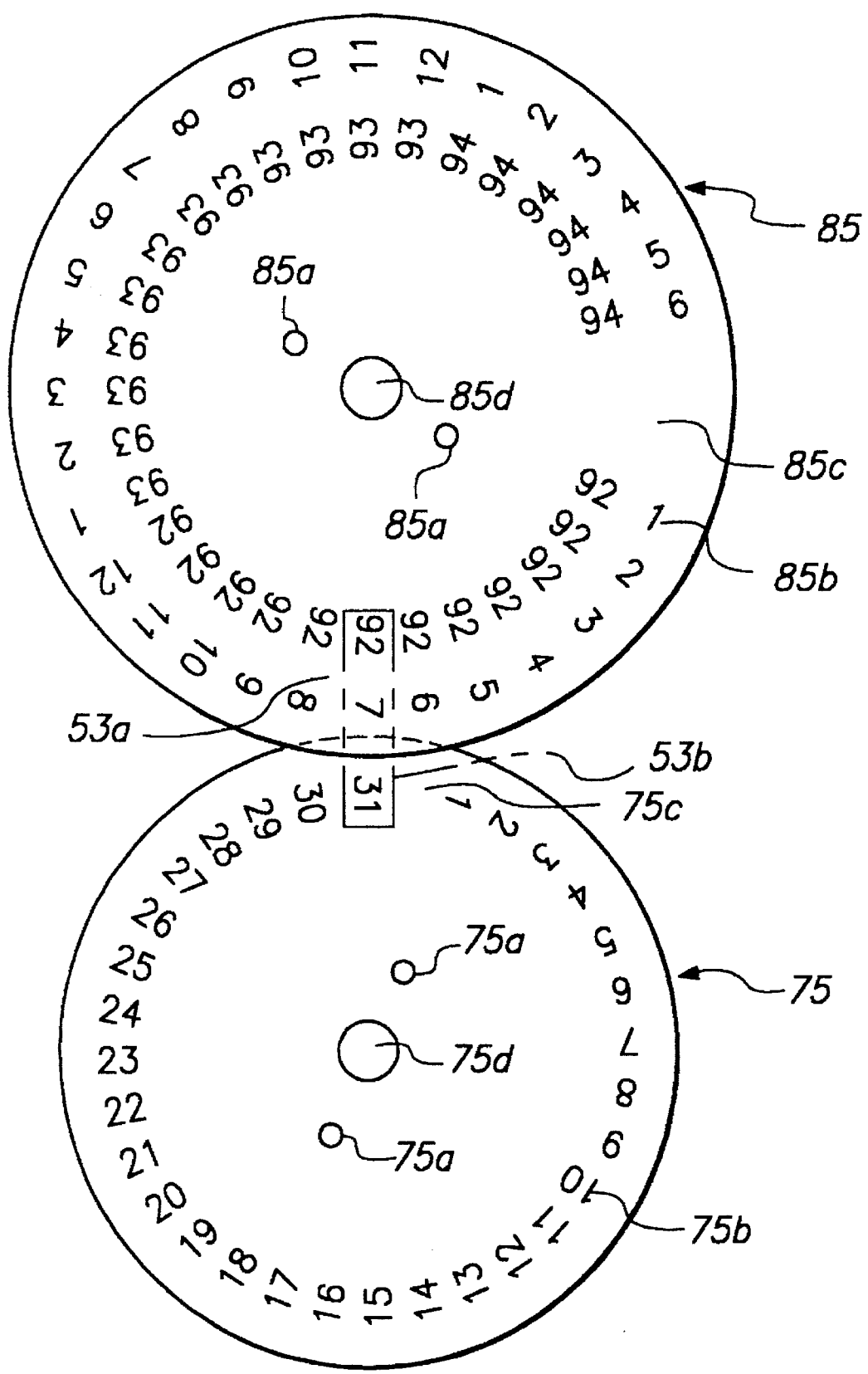
FIG. 9 is a plane view showing the two print data plates in the same data print unit.

FIG. 3 is an exploded perspective view showing the data print unit of the embodiment as seen from the top frame, FIG. 4 is an exploded perspective view showing the same data print unit as seen from the bottom frame, FIG. 5 is a plane view showing the same data print unit as seen from the upper frame, FIG. 6 is a cut plane view showing the cut plane along line 1004 in FIG. 5, FIG. 7 is a cut plane view showing the cut plane along line 1000 in FIG. 5, FIG. 8 is a plane view showing the two data indicator wheels in the same data print unit, and FIG. 9 is a plane view showing the two print data plates in the same data print unit.

While data print unit 40 is an assembled unit that is made one unit by holding the lower frame 50 and upper frame 60 together with retaining tabs, data indicator wheels 70, 80 and print data plates 75, 85 are disposed on either side, respectively, and secured in place with flanged pins 78, 88. As shown in FIG. 4, dowels 61a, 61b are formed on the inside surface of the thin part of upper frame 60. Dowel holes 92a, 92b are formed on circuit board 90 on which light emitting diode 91, which serves as the light source, is formed. Circuit board 90 has a protruding member 93, and a dowel hole 92a is formed in protruding member 93. A resistor 94 for limiting the current of light emitting diode 91 is disposed between external lead terminal 95 of circuit board 90 and light emitting diode 91. When dowel holes 92a, 92b and dowels 61a, 61b are lined up in their mating position and circuit board 90 is attached to upper frame 60, the length of protruding member 93 functions as a stopper to limit shifting of circuit board 90 in the direction of thickness, thus facilitating easy assembly as well as preventing undesired movement of circuit board 90 when soldering lead wires 111a, 111a to external lead terminals 95a, 95b of circuit board 90 and preventing shifting of the set position of the emitting surface of light emitting diode 91. A pressed lead plate, etc., may be used in instead of lead wires 111a for electrical connection between data print unit 40 and switch unit 110.

As shown in FIGS. 4 and 6, a reflecting mirror housing 62 is formed nearly in the center inside upper frame 60, and a reflecting mirror 96, comprising a glass plate on which aluminum has been deposited, is fixed on the approximately 45-degree inclined surface. A structure that prevents irregular reflections is formed, together with the structure of lower frame 50 described below, in the area from light source housing 63 to reflecting mirror housing 62 on the inside of upper frame 60. This structure for preventing irregular reflection has a nonreflective honed inside surface and a multiple slit structure 64 for attenuating reflected light. The first slit structure in upper frame 60 comprises slit limiting projection 64aa, which has a triangular cross section, and slit limiting projections 64ab, 64ac perpendicular to the left and right of this and which have a triangular cross section, and these are formed on the bottom face toward light source housing 63. The second slit structure is positioned on the side of the first slit structure toward which the light beam progresses and comprises slit limiting projection 64ba formed on the bottom face inside upper frame 60 and which has a triangular cross section. The third slit structure is positioned on the side of the second slit structure toward which the light beam progresses and comprises slit limiting projection 64ca, which has a triangular cross section, and slit limiting projections 64cb, 64cc perpendicular to the left and right of this and which have a triangular cross section, and these are formed on the bottom face inside upper frame 60. The fourth slit structure is positioned on the side of the third slit structure toward which the light beam progresses and comprises the slit limiting projection 64da formed on the bottom face inside upper frame 60 and which has a triangular cross section. The fifth slit structure is positioned on the side of the fourth slit structure toward which the light beam progresses and comprises the slit limiting projection 64ea, which has a triangular cross section, and slit limiting projections 64eb and 64ec perpendicular to the left and right of this and which have a triangular cross section, and these are formed on the bottom face inside upper frame 60.

Cylindrical bearings 65, 66 formed as shaft holes 65a, 66a, into which shafts 71, 81 of data indicator wheels 70, 80 are inserted and are capable of rotating, are formed at nearly symmetrical positions on the left and right sides of reflecting mirror housing 62. Also, positioning dowels 67a, 67b for attaching lower frame 50 as described below are provided on a pair of thick corners of upper frame 60. Further, retaining holes 67c for hooking on the retaining tabs of the lower frame 50 are formed in three locations on the thick parts of upper frame 60.

As shown in FIG. 3, circular grooves 65b, 66b are formed around cylindrical bearings 65, 66 on the outside surface of upper frame 60. Through holes 65c, 66c are provided in the area between circular grooves 65b, 66b, and spring members 65d, 66d protrude out from the side walls of through holes 65c, 66c as integrated members. The base of spring members 65d, 66d has elasticity, and their respective ends are provided with humped latches 65e, 66e facing bearings 65, 66. Data selection indicator marks 68a, 68b are formed on the thick parts of the short sides of upper frame 60.

As shown in FIG. 3, lower frame 50 has circular openings 51, 52 in which cylindrical bearings 65, 66 on upper frame 60 can fit and data light transmission holes 53a, 53b formed in the area between circular opening 51, 52. Data light transmission holes 53a, 53b are separated by a light-shielding partition 53c. One data light transmission hole 53a transmits the data light for the month and year, while the other data light transmission hole 53b transmits the data light for the day, and the lengthwise dimension of data light transmission hole 53a is formed longer than that of the data light transmission hole 53b due to the number of data digits. Ribs 51a, 52a in the shape of the number "5" are formed around the outside of both data light transmission holes 53a and 53b. Ribs 51a, 52a prevent stray light from entering the print optical system as well reinforce the unit. Also, as shown in FIGS. 3 and 6, slit limiting protrusions 55a, 55b, 55c, which make up part of multiple slit structure 64, are formed in a row with data light transmission holes 53a, 53b. Three retaining holes 67c are formed in thick parts of upper frame 60, and retaining tabs 54 that engage these are provided on the inside surface of lower frame 50. Dowel holes 55 in which dowels 67a, 67b of upper frame 60 and dowels 35a, 35b of the camera body fit are formed in the four corners of lower frame 50. Further, ear-shaped retainer members 56a, 56b are formed on the outside of the short sides of lower frame 50, and these hook on retainer tabs 36a, 36b on the camera body. Data plate housings 51b, 52b, which are the thin parts around circular openings 51, 52 are formed on the outside of lower frame 50. As described below, since the pair of print data plates 75, 85 are of differing sizes, data plate housing 52b is frowned larger than the other data plate housing 51b.

Data indicator wheel 70 has a shaft 71 that fits in shaft hole 65a, a circular plate-like flange 72 formed as an integral member on one end and a circular gear (ratchet gear) 73 formed as an integral member on the underside of the flange member 72. Parallel graduation marks are formed on the circumference of flange 72. As shown in FIG. 8, day indicator sections 72a that indicate the odd numbers from 1 to 31 and the dot indicator sections 72b that indicate dots between day indicator sections 72a, 72a are formed near the outer edge on the top surface of flange 72 by screen printing, offset printing or other technique. Dot indicator sections 72b indicate the even numbers 1–31 and are used to facilitate the listing of the day data in the limited space on flange 72. Therefore, it is possible to print data indicator sections 72a with large numbers on flange 712, which has relatively little surface area, and the resulting improved readability helps to prevent incorrect date alignment. A pin hole 71a with an interference fit to allow the insertion of pin member 78a of flanged insertion pin 78 and arc-shaped grooves 71b and 71b surrounding pin hole 71a are formed on the end surface of shaft 71 of data indicator wheel 70. Dowels 71c, 71c for lining up the position for insertion in dowel holes 75a, 75a of print data plate 75 are also provided on the end surface of shaft 71. The diameter out to the ends of the teeth of circular gear 73 is smaller than that of flange 72. There is an inner circular groove 73a between circular gear 73 and shaft 71. Circular gear 73 fits in circular groove 65b of upper frame 60, and gear teeth 73b engage humped latch 65e of spring member 65d.

Similarly, data indicator wheel 80 has a shaft 81 that fits in shaft hole 66a, a circular plate-like flange 82 formed as a single unit on one end and a circular gear (ratchet gear) 83 formed as a single unit on the underside of flange 82. Parallel graduation marks are formed on the circumference of flange 72. Year indicator sections 82a that indicate the last two digits "92" of the year 1992, the last two digits "93" of the year 1993 and the last two digits "94" of the year 1994 are formed on the inner area of the surface of flange 82, and a month indicator section 82b that indicates the odd numbers from 1 to 12 outside year indicator section 82a where "92" is indicated, a month indicator section 82b that indicates the odd numbers from 1 to 12 outside year indicator section 82a where "93" is indicated and a month indicator section 82b that indicates the numbers "1", "3" and "5" outside year indicator section 82a where "94" is indicated and dot indicator sections 82c that indicate dots between month indicator sections 82b, 82b are formed on the top surface of flange 82 by screen printing, offset printing or other technique. Dot indicator sections 82c indicate the even numbers and are used to facilitate the listing of the year-month data in the limited space on flange 82. Therefore, it is possible to print large numbers on flange 82, which has relatively little surface area, and the resulting improved readability helps to prevent incorrect date alignment. Further, a non-data indicator area 82d at least one pitch wide is provided between the month indicator "1" belonging to the number "92" and the dot indicator belonging to the number "94".

A pin hole 81a with an interference fit to allow the insertion of pin member 88a of flanged insertion pin 88 and arc-shaped grooves 81b, 81b surrounding pin hole 81a are formed on the end surface of shaft 81 of data indicator wheel 80. Dowels 81c, 81c for lining up the position for insertion in dowel holes 85a, 85a of print data plate 85 are also provided on the end surface of shaft 81. The diameter out to the ends of the teeth of circular gear 83 is smaller than that of flange 82. There is an inner circular groove 83a between circular gear 83 and shaft 81. Circular gear 83 fits in circular groove 66b of upper frame 60, and gear teeth 83b engage humped latch 66e of spring member 66d.

In this way, a pair of data indicator wheels 70 and 80 indicate the year-month-day data for a 30-month period from Jan. 1, 1992 to Jun. 30, 1994, for example. The reason why a 30-month data indicator is used is as follows. The life of a non-removable-film camera, the film of which cannot be replaced by the user when it is used up, is approximately two years. Considering the stocking period up until the data print unit is attached to the non-removable-film camera, the ability to print data for 30 months is sufficient, and there is no need for 5 or 10 years worth of long-term date data. Further, by aligning the dot indicator section 72b between the indicators "31" and "1" on the data indicator wheel 70 with the mark 68a and aligning the non-data indicator area 82d on the data indicator wheel 80 with the mark 68b, the data print unit can be set to a condition in which data are not printed. By setting the data print unit to this data nonprint condition when it is shipped out, the inadvertent printing of incorrect data by the user after purchase can be prevented.

Print data plates 75, 85 are, for example, formed by punching out circular negative plates from photographic film that has been exposed with the prescribed data. Print data plate 75 has translucent day data sections 75b formed in the shape of the numbers "1" to "31" around its outer edge, and the remaining area blocks light. Also, a light-blocking non-data area 75c that is at least one pitch wide is left between the data section of the number "31" and the data section of the number "1". A central hole 75d through which pin member 78a of flanged insertion pin 78 passes is formed in the center of print data plate 75, and two dowel holes 75a are formed. Print data plate 85 is a larger disc than print data plate 75 and has translucent year-month data sections 85b formed in the shape of the numbers "92 1" to "92 12", the numbers "93 1" to "93 12" and the numbers "94 1" to "94 6" around its outer edge, and the remaining area blocks light. Since the year-month data sections 85b for data related to the year and month are formed on a single print data plate, fewer parts, greater compactness and lower costs can be realized. Further, since only two indicator wheels need to be turned to select three data, operation is simplified. A light-blocking non-data area 85c that is at least one pitch wide is left between the data section of the number "92 1" and the data section of the number "94 6". A central hole 85d through which the pin member 88a of flanged insertion pin 88 passes is formed in the center of print data plate 85, and two dowel holes 85a are formed. Print data plates 75, 85 with these translucent sections and light-blocking sections can be produced by a photolithography technique, but their production is not limited to this and they can also be produced by a diffusion transfer technique that uses a translucent plastic film and transfers data that has been printed on a printing or photographic paper to the film. They can also be formed by etching or punching out using a metal plate. They can also be produced by a monochrome scanner technique that prints the scanned data by means of a laser beam.

Flanged insertion pin 78 comprises pin member 78a and flange 78b joined at one end, and notches 78c are formed on the edge of flange 78b to allow clearance for the ends of dowels 71c that pass through dowel holes 75a. Flanged insertion pin 85 comprises pin member 88a and flange 88b joined at one end, and notches 88c are formed on the edge of flange 88b to allow clearance for the ends of dowels 81c that pass through dowel holes 85a.

In the assembly of a data print unit 40 with this configuration, first reflecting mirror 96 and circuit board 90 are inserted in upper frame 60, dowel holes 55, 55 are positioned on dowels 67a, 67b, and retaining tabs 54 are hooked in retaining holes 67c, whereby upper frame 60 and lower frame 50 become a single unit. As a result, reflecting mirror 96 and circuit board 90 are secured in placed and cylindrical bearings 65, 66 fit in circular holes 51, 52. Here, the positioning operation is simplified by dowels 67a, 67b and dowel holes 55, 55. Further, since retaining tabs 54 are at positions forming nearly an equilateral triangle on unit 40, thin upper frame 60 and lower frame 50 fit together well and bowing, warping, etc., are effectively prevented, thus preventing the internal optical parts from shifting.

Figure 10A:
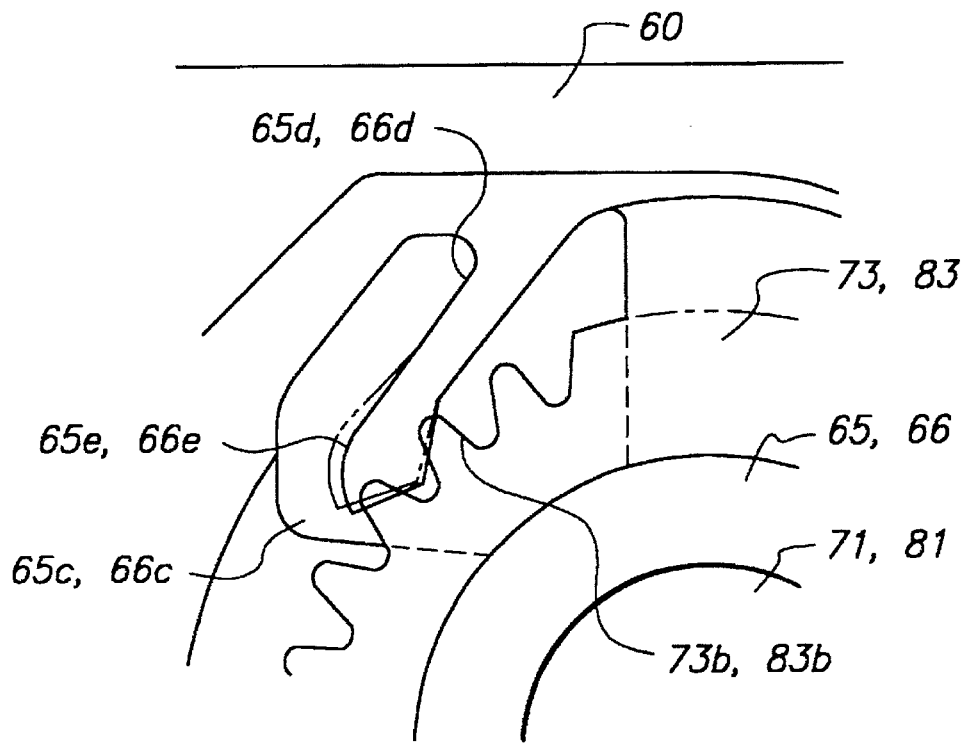
FIG. 10A is a plane view showing the meshed relationship between the damping member and gear in the same data print unit.
Figure 10B:
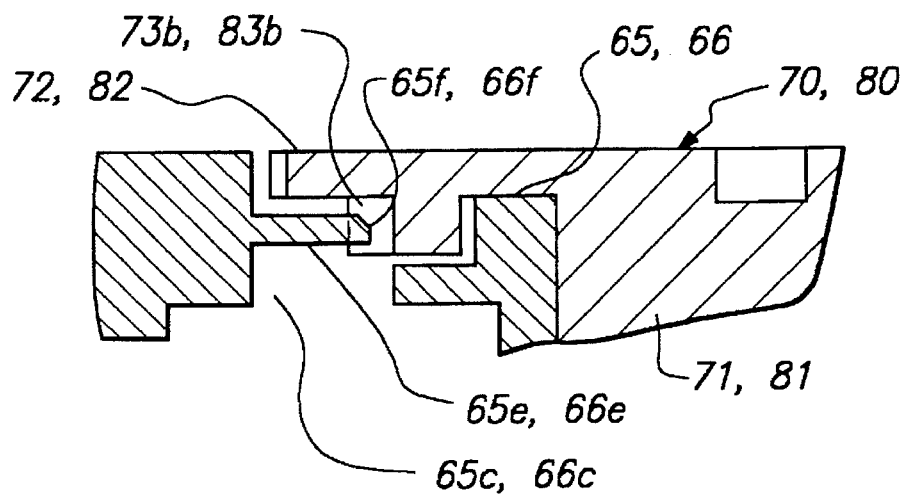
FIG. 10B is cross section showing the meshed condition between the damping member and gear in the same data print unit.

Next, shafts 71, 81 of data indicator wheels 70, 80 are inserted in shaft holes 65a, 66a of upper frame 60 of the assembled unit of upper frame 60 and lower frame 50. In the process of inserting shafts 71, 81, gear teeth 73b, 83b of circular gears 73, 83 come in contact with humped latches 65e, 66e on spring members 65d, 66d, but since inclined surfaces 65f, 66f are formed on the part of humped latches 65e, 66e that comes in contact with gear teeth 73b, 83b as shown in FIG. 10B, spring members 65d, 66d are flexed back from the position of the solid line to the position of the double-dashed line in FIG. 10A and humped latches 65e, 66e and gear teeth 73b, 83b mesh. Therefore, shafts 71, 81 need only be inserted in shaft holes 65a, 66a. As a result of this insertion, dowels 71c, 81e of shafts 71, 81 protrude into the open space of data plate housings 51b, 52b. Dowel holes 75a, 85a of data plates 75, 85 are fitted on protruding dowels 71e, 81c. Here, the indicator data on data indicator wheels 70, 80 correspond to the data on print data plates 75, 85. Also, pin member 78a of insertion pin 78 is press fitted in central hole 75d and pin hole 71a and secured in place, and pin member 88a of insertion pin 88 is press fitted in central hole 85d and pin hole 81be and secured in place.

In the assembly method for data print unit 40, data indicator wheels 70, 80, which are shaped somewhat like rivets, are attached from upper frame 60 side and data plates 75, 85 are attached from lower frame 50 side to the outside of the assembled unit, which houses the optical parts, etc., and comprises upper frame 60 and lower frame 50, and insertion pins 78, 88 are pressed fitted. Therefore, the assembly operation is extremely efficient. Also, when updating data plate 85 with 30-month year-month data, data plate 85 can be easily removed by pulling out insertion pin 88.

This ease of assembly and replacement are due to the structure of data indicator wheels 70, 80. That is, data indicator wheels 70, 80 not only have a data indicator function, but they also have circular gears 73, 83 as rotational positioning means on the underside of the flange and dowels 71c, 81c as positioning means for data plates 75, 85 on the end of shafts 71, 81. As shown in FIG. 7, the diameter out to the ends of the gear teeth on circular gears 73, 83 is smaller than that of flanges 72, 82. This facilitates insertion of display wheels 70, 80, but the diameter of circular gears 73, 83 is closer to the diameter of flanges 72, 82 than to the diameter of shafts 71, 81. Meshing play unavoidably occurs between the gear teeth 73b and 83b and humped latches 65e, 66e of spring members 65d, 66d, and when the diameter out to the ends of the teeth is small, that play is amplified in data sections 75b, 85b of data plates 75, 85, thus resulting in deformation, dropout or fuzziness of the print data numbers. However, since the position of gear teeth 73b, 83b is near flanges 72, 82, amplification of mesh play can be suppressed, thus contributing to data exposure quality. Also, circular grooves 65, 66 are formed on the inside of circular gears 73, 83 on data indicator wheels 70, 80, and cylindrical bearings 65, 66 fit in these. Therefore, the bearing length in the direction of thrust of the bearing is longer by the length of circular grooves 65b, 66b than if there were no circular grooves 65b, 66b. Since the length of bearings 65, 66 is approximately 4 mm and circular grooves 65b, 66b is approximately 1 mm, the circular groove increases the bearing length by approximately 33 percent. This increase in bearing length has the effect of suppressing play and eccentric rotation of data indicator wheels 70, 80 themselves, thus making it possible to suppress deformation, dropout and fuzziness of the print data numbers. Further, as shown in FIG. 5, since spring members 65d, 66d are positioned near data light transmission holes 53a, 53b, i.e., at mutually opposing positions between adjacent display wheels 70, 80, blurring or deformation at those parts of data plates 75, 85 facing data light transmission holes 53a, 53b can be suppressed. If the spring members are located in the corners of upper frame 60, meshing play between the spring members and the gear teeth is amplified, thus resulting in the generation of deformation or distortion at those parts of the data plates facing the data light transmission holes.

Figure 11:
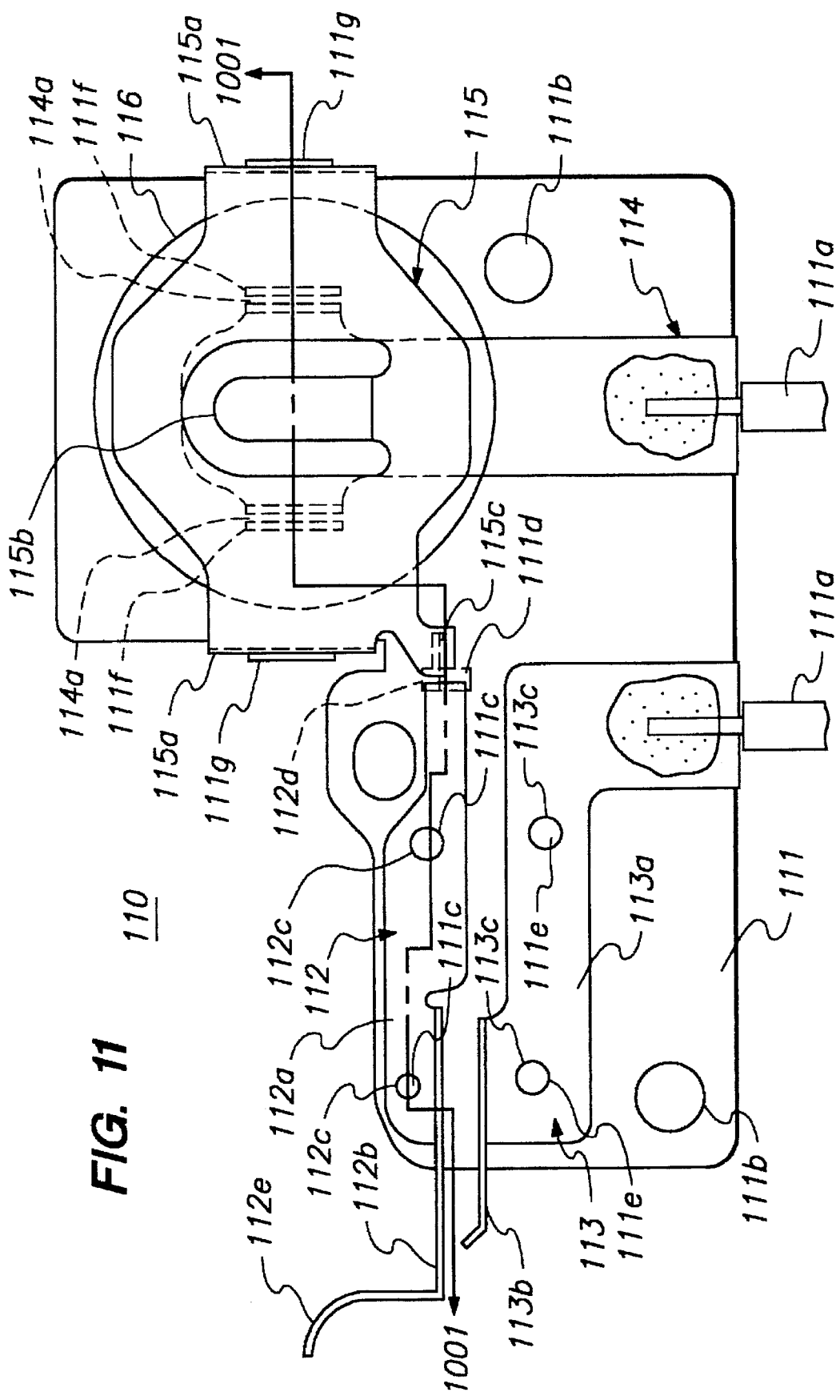
FIG. 11 is a plane view showing the switch unit of the same embodiment.
Figure 12:
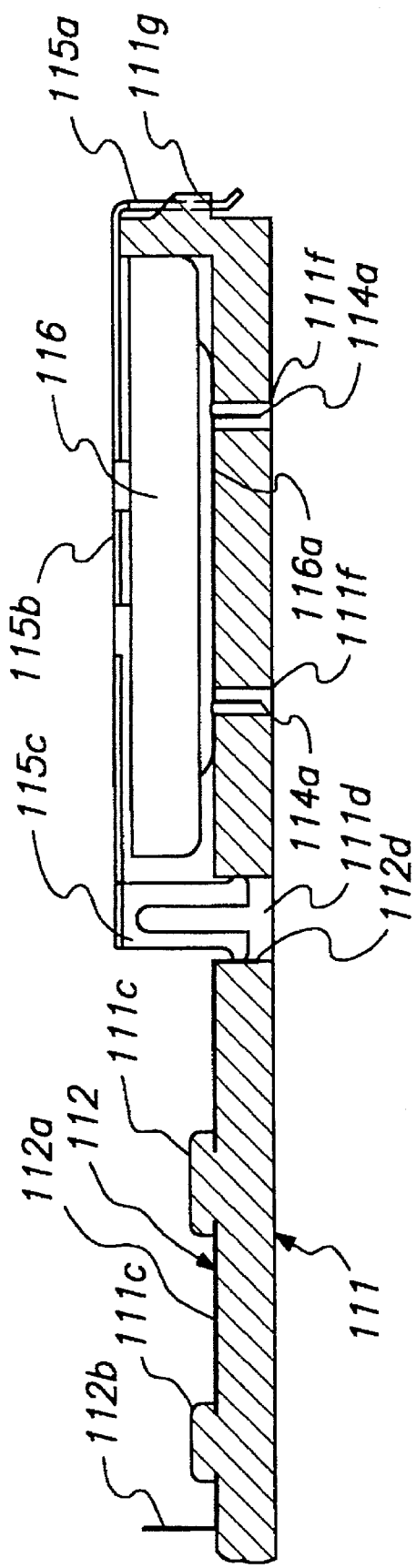
FIG. 12 is a cut plane view showing the cut plane along line 1001 in FIG. 11.
Figure 13:
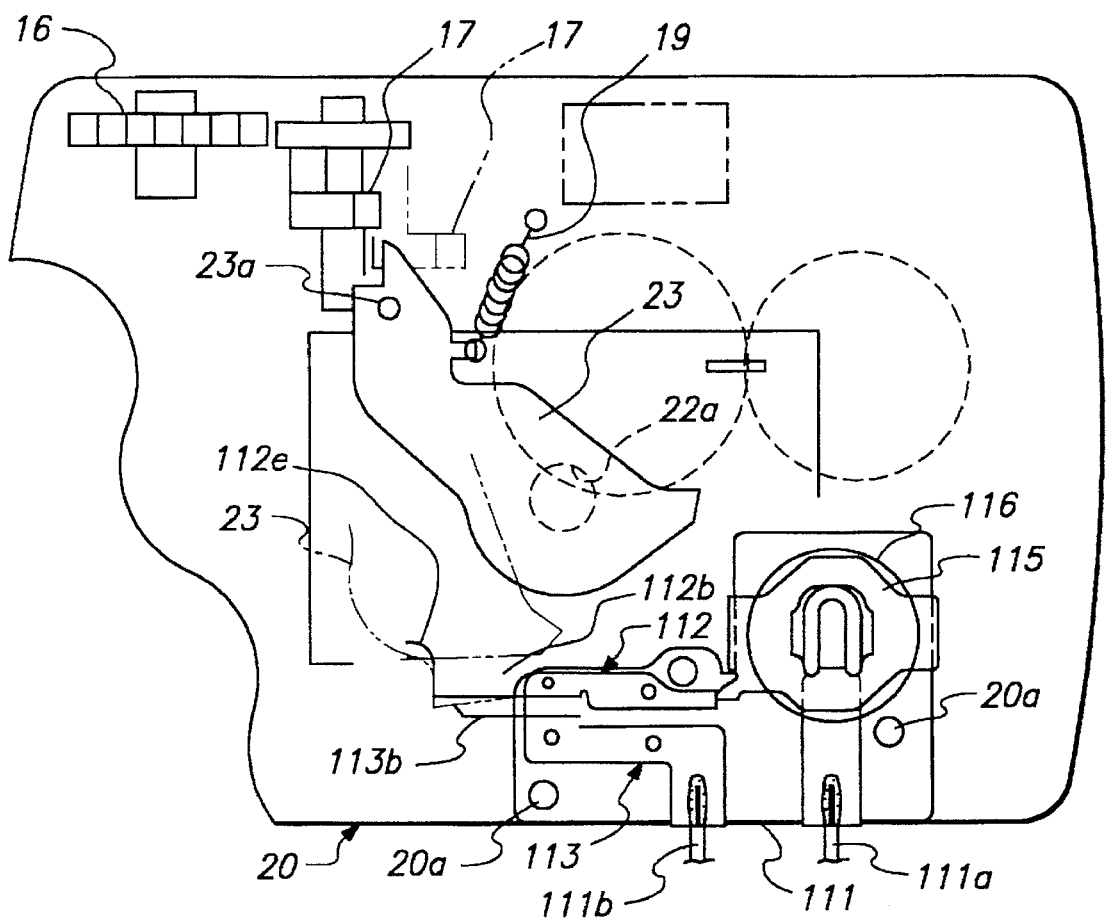
FIG. 13 is a plane view showing the attached condition of the same switch unit.

FIG. 11 is a plane view showing the switch unit of this embodiment, FIG. 12 is a cut plane view showing the cut plane along line C—C in FIG. 11, and FIG. 13 is a plane view showing the attached condition of the same switch unit.

Switch unit 110 comprises circuit board 111, switch plates 112, 113, negative terminal plate 114 and battery presser metal 115. Circuit board 111 is a flat nearly L-shaped insulating substrate with two dowel boles 111b. Switch unit 110 is attached to the camera body by lining up dowel holes 111b and dowels 20a formed in middle case 20. One switch plate 112 has a plate-shaped member 112a attached to substrate 111 and a contact member 112b extending out from one end. Plate-shaped member 112a has two dowel holes 112c, and the two dowels 111c on substrate 111 are positioned on dowel holes 112c and passed through them, whereby switch plate 112 is secured to substrate 111. The edge of plate-shaped member 112a is formed into a bending member 112d, and this engages the inside of stop hole 111d formed in substrate 111. The end of contact member 112b has a curved contact member 112e on which the edge of shutter blade 23 comes in contact. The other switch plate 113 bas a plate-shaped member 113a attached to substrate 111 and a contact member 113b extending out from one end. Two dowel holes 113c are formed in this plate-shaped member 113a, and the two dowels 111e on substrate 111 are positioned on dowel holes 113c and passed through them, whereby switch plate 113 is secured to substrate 111. A lead wire 111a is soldered to one end of plate-shaped member 113a of switch plate 113. Negative terminal plate 114 has a bending member 114a, and this is inserted in insertion hole 111f formed in the substrate. A lead wire 111a is soldered to one end of negative terminal plate 114. Negative electrode 116a of a disc-shaped battery 116 is pressed against negative terminal plate 114. Positive electrode 116b of battery 116 is pressed down by battery presser metal 115. Hooks 115a, which engage protrusions 111g formed on the substrate, are formed on battery presser metal 115. Also, a spring member 115b is formed nearly in the center of battery presser metal 115, and its elastic force presses down on battery 116. A two-level spring member 115c is formed at one end of battery presser metal 115, and this is inserted in stop hole 111c of the substrate. One leg of two-level spring member 115c is in contact with bending member 111d of switch plate 112 with elastic force. Conductive contact is achieved in this two-level spring member 115c between battery presser metal 115 as the positive electrode and switch plate 112. In the assembly method of switch unit 110, first dowels 111c, 111e of substrate 111 are lined up with dowel holes 112c, 113e of switch plates 112, 113 and the two are assembled, after which bending member 114a of negative terminal plate 114 is inserted in hole 11f of the substrate. Next, battery 116 is placed on negative electrode plate 114, and then two-level spring member 115c of battery presser metal 115 is inserted in stop hole lid, and hooks 115a are hooked on protrusions 112g.

Figure 14:
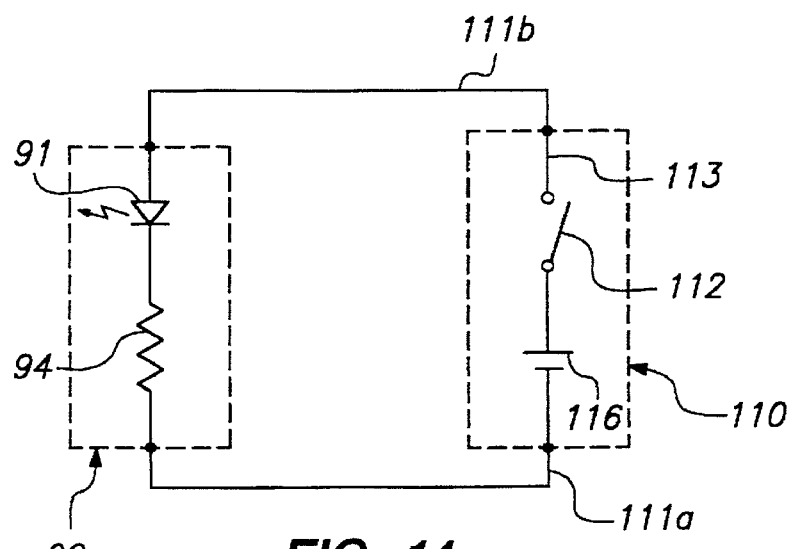
FIG. 14 is an electronic circuit diagram showing the light source illumination control circuit of the same embodiment.

FIG. 14 is an electronic circuit diagram showing the lamp illumination control circuit of the data print unit. Battery 116 and switch plates 112, 113 connected in series as a switch to it are disposed in switch unit 110 mounted in the camera body. Resistor 94 and a light-emitting diode connected in series to it are provided on circuit board 90. Switch plate 113 and light-emitting diode 91 are connected by lead wire 111b. The negative electrode of battery 116 and resistor 94 are connected by lead wire 111a. In this embodiment, lead wires 111a, 111b were used, but a lead wire board manufactured by press working may be used instead.

As shown in FIG. 13, non-removable-film cameras are generally ready to shoot a picture when the film is advanced by turning film advance knob 16 manually. Here, when shutter lever 17 is not operated, shutter blade 23 covers light hole 22a between photographic lens 24 and photographic film 2. When shutter lever 17 is depressed, shutter blade 23 swings on axis 23a from the position indicated by the solid line in FIG. 13 to the position indicated by the double-dashed line and opens light hole 23a, whereby the subject is exposed on photographic film 2. The rotation of shutter blade 23 causes its edge to push down switch plate 112 via curved contact member 112e of the switch plate. This causes contact member 112b of switch plate 112 and contact member 113b of switch plate 113 to come in contact and close the switch, whereby current is supplied from battery 116 to light-emitting diode 91 and light-emitting diode 91 comes on for a fixed period of time. When depressed shutter lever 17 is released, however, shutter blade 23 and shutter lever 17 are returned by the force of return spring 19. Here, movable contact member 112b of switch plate 112 is configured such that it comes in contact with contact member 113 of switch plate 113 as shutter blade 23 rotates. That is, switch plates 112, 113 serve as both the means for detecting the timing for illuminating light-emitting diode 91 and as the switch that supplies the current necessary to illuminate it. Therefore, switch unit 110 can be attached without changing the mechanism design of the body of existing non-removable-film cameras.

When light-emitting diode 91 comes on, the emitted light beam passes by multiple slit structure 64, which has an irregular reflection prevention structure, and arrives at reflecting mirror 96, where it is reflected in the direction of thickness of the unit. The reflected light beam passes through data light transmission holes 51a, 51b to illuminate data sections 75b, 85b of data plates 75, 85 facing the holes. Data sections 75b, 85b are translucent, thus causing the illumination light to take on the shapes of the number string of data sections 75b, 85b, and this projected light beam exposes the data on the rear surface of photographic film 2. In this way, printing of the data on the photographic film is completed. Here, data plates 75, 85 are positioned so that they partially overlap, thus making it possible to block the light that passes by the circumferential member of data plates 75, 85 in the vicinity of data sections 75b, 85b. Data light transmission holes 53a, 53b are separated by light-shielding partition 53c, and light-blocking shielding 53c blocks the light that passes by the circumferential member of data plates 75, 85 in the vicinity of data sections 75b, 85b, thus enhancing the light-shielding performance. Therefore, as shown in FIG. 7, the ranges $D_1$ and $D_2$ through which light is passed are limited with respect to the rear surface of film 2. In this embodiment, the circumferential member of large-diameter month-year data plate 75 is positioned on the outside and the circumferential member of small-diameter day data plate 85 is positioned on the inside, thus making it possible to prevent damage or deformation of data sections 85b due to unintentional bending of the outside circumference of day data plate 85 when year-month plate 75 is replaced (updated).

Second Embodiment

The second embodiment has the following features. In the first embodiment, battery 116 was mounted on substrate 111 of switch unit 110, but in this embodiment battery 116 is mounted in data printer unit 140. Also, a light source illumination control circuit that keeps the illumination time constant each time data are printed is built into data print unit 140.

Figure 15:
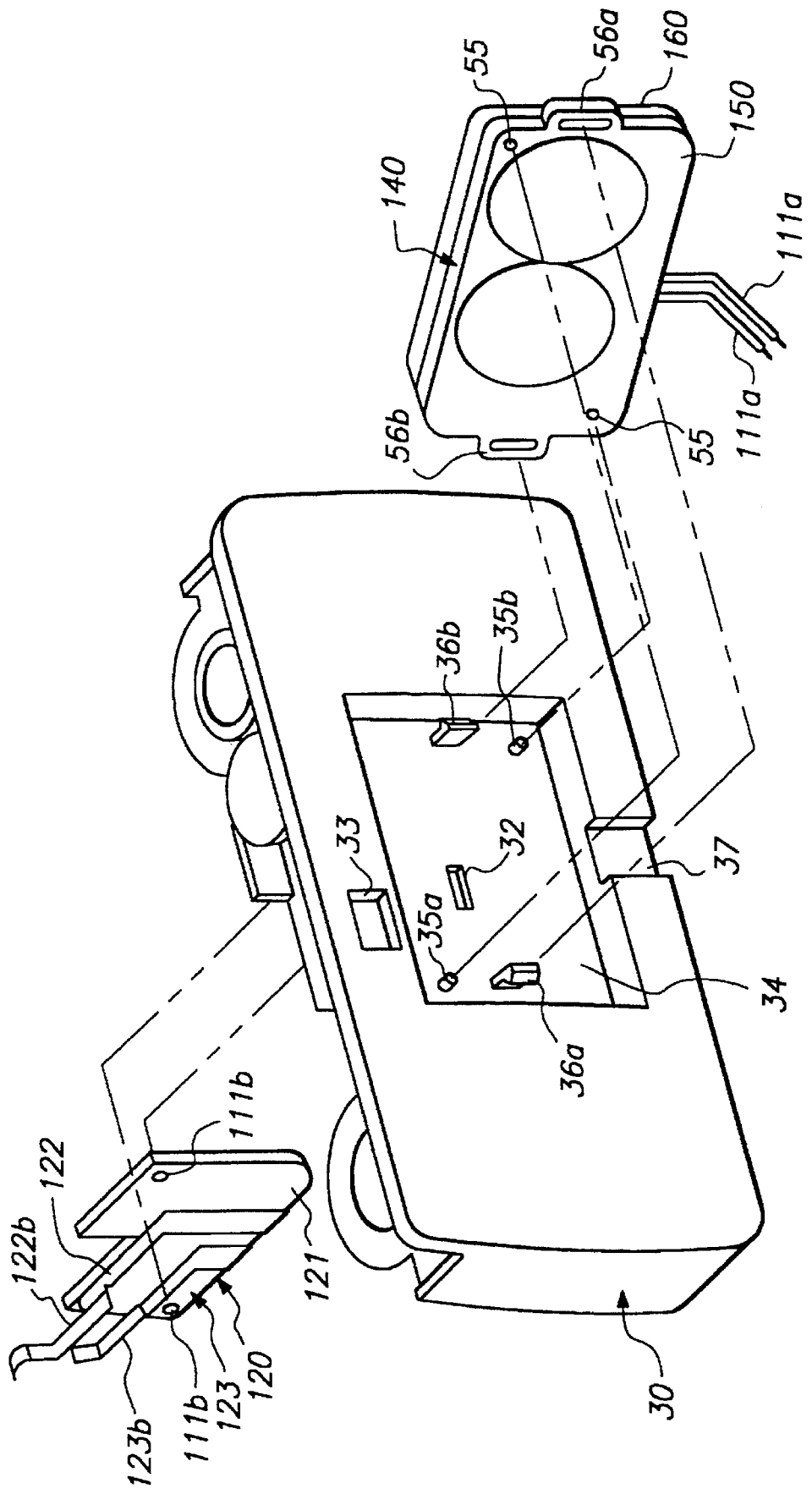
FIG. 15 is an exploded perspective view showing the camera body of a non-removable-film camera with its front case removed and equipped with the data print unit of the second embodiment of the invention, the data print unit and the switch unit.
Figure 16:
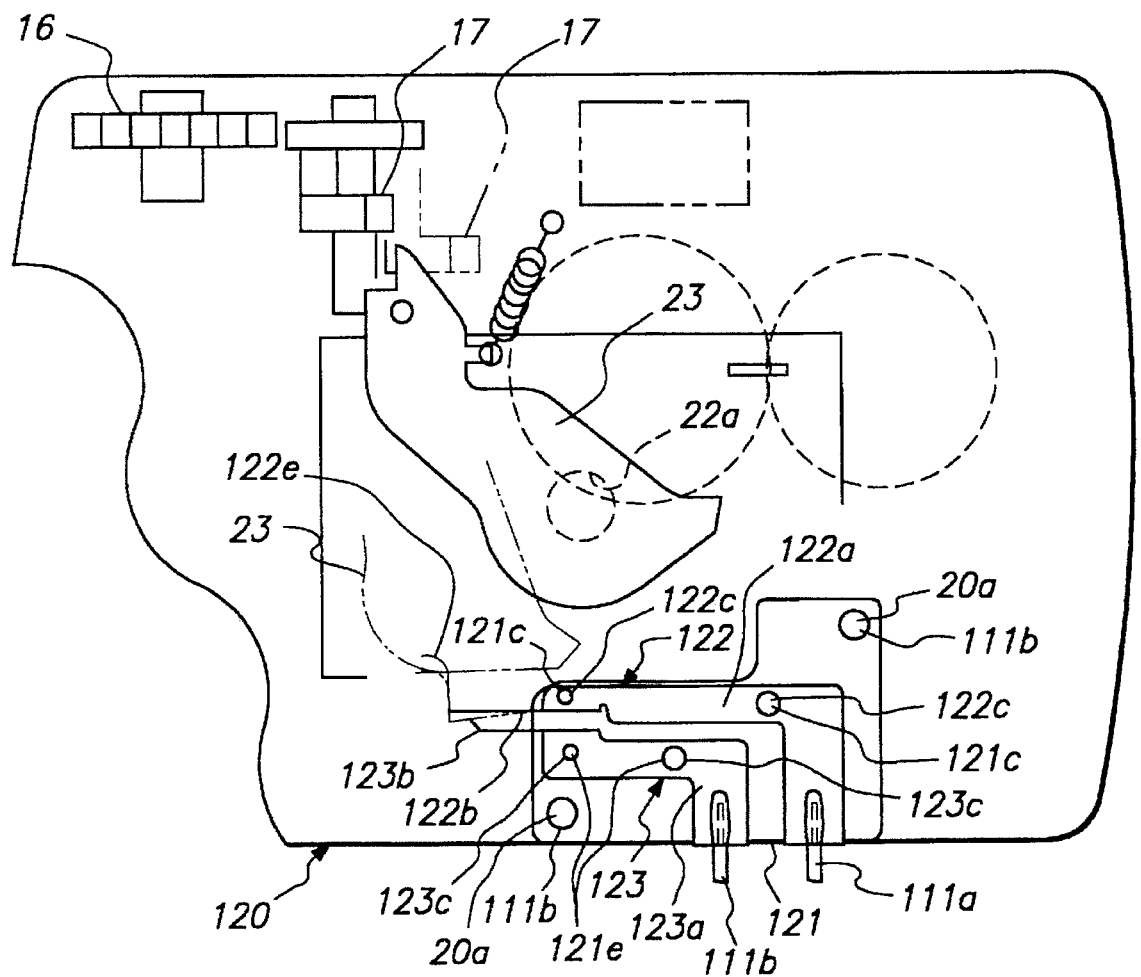
FIG. 16 is a plane view showing the attached condition of the same switch unit.
Figure 17:
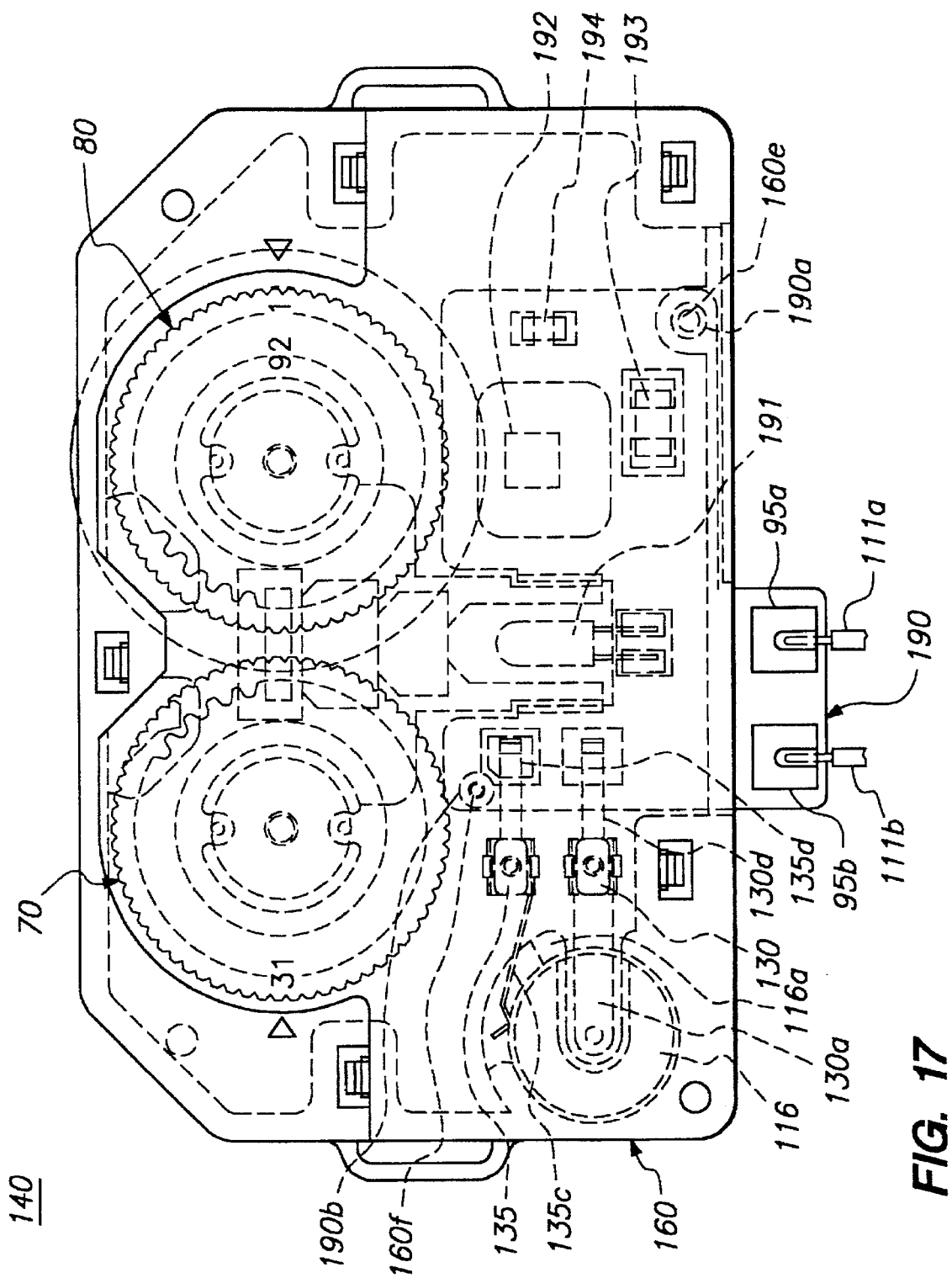
FIG. 17 is a plane view showing the same data print unit as seen from the upper frame.

In FIGS. 15–17, the same components as in the first embodiment are indicated by the same reference numbers.

Switch unit 120 comprises substrate 121 and switch plates 122, 123. Substrate 121 is a flat, generally L-shaped insulating substrate with two dowel holes 111b. Switch unit 120 is attached to the camera body by lining up these dowel holes 111b and dowels 20a formed in the middle case. Switch plate 122, however, has a plate-shaped member 122a attached to substrate 121 and a contact member 122b extending out from one end. Two dowel holes 122c are formed in plate-shaped member 122a, and switch plate 122 is fixed to substrate 121 by lining up dowels 121c on substrate 121 with dowel holes 122c and passing them through. Lead wire 111a is soldered to one end of plate-shaped member 122a. The end of contact member 122b has a curved contact member 122e on which the edge of shutter blade 23 comes in contact. The other switch plate 123 has a plate-shaped member 123a attached to substrate 121 and a movable contact member 123b extending out from one end. Two dowel holes 123c are formed in this plate-shaped member 113a, and the two dowels 121e on substrate 121 are positioned on these dowel holes 123c and passed through them, whereby switch plate 123 is secured to substrate 121. A lead wire 111a is soldered to one end of the plate-shaped member 123a of the switch plate 123. Switch unit 120 has two switch plates 122, 123, and as in the first embodiment, contact members 122b, 123b open and close in response to the rotation of shutter blade 23, but there is no battery.

Figure 18:
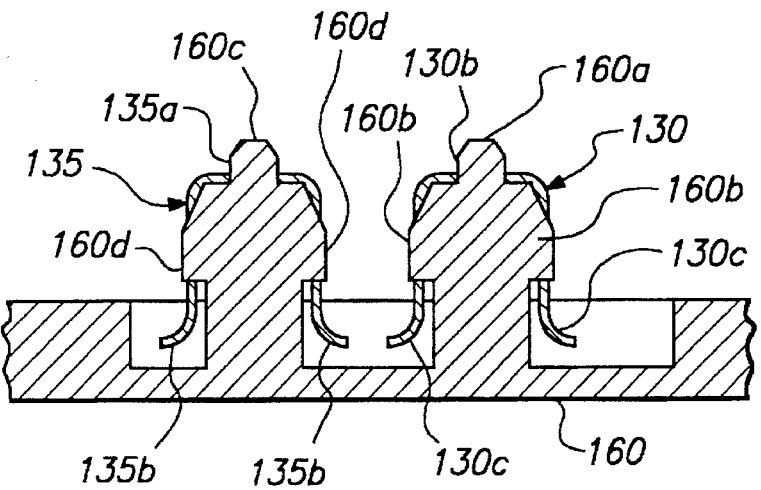
FIG. 18 is a cross section showing the attached condition of the switch plate in the same switch unit.

In the structure of data print unit 140, however, data indicator wheels 70, 80, data plates 75, 85 and remaining data selection mechanism have the same configuration as in the first embodiment, but the components mounted on circuit board 190 and the housing structure for battery 116 are different. Circuit board 190 is sandwiched between upper frame 160 and lower frame 150. Battery 116, tungsten lamp 191 for use as the light source, integrated circuit 192, capacitor 193, resistor 194 and other components are mounted on circuit board 190. Copper foil electrodes and a wiring pattern are formed where required on the surface of circuit board 190. Lamp 191, capacitor 193 and resistor 194 are soldered to the electrodes. Integrated circuit 192 is connected to circuit board 190 by wire bonding in the case of a bare chip and is soldered in the case of a package IC. Tungsten lamp 191 offers good exposure quality compared to a light-emitting diode since it emits light over the entire wavelength band, but because its brightness fluctuates, the resistance value of resistor 194 that determines the length of illumination time is ranked, and the illumination time is adjusted by attaching a resistor of a rank corresponding to the brightness of lamp 191, whereby the amount of light for printing is maintained constant. Dowel holes 190a, 190b are formed in circuit board 190, and these are positioned on dowels 160e, 160f on the upper frame and fitted on them. Battery 116 is held in place by rib 116a formed in upper frame 160 so that it surrounds battery 116, plate spring 130a of negative electrode plate 130 and lower frame 150. As shown in FIG. 18, negative electrode plate 130 has a dowel hole 130b that is positioned on dowel 160a formed in upper frame 160, and hooks 130c are formed on both sides of dowel hole 130b. Hooks 130c engage protrusions 160a on upper frame 160. Also, negative electrode plate 130 has a plate spring 130d that comes into elastic contact with the negative electrode of circuit board 190. Hook 135b engages protrusion 160d on upper frame 160. Positive electrode plate 135 has a plate spring 135c that protrudes out and comes into elastic contact with the side surface of battery 116, while it also has a plate spring 135d that protrudes out on the other side and comes into elastic contact with the positive electrode of circuit board 190. Since battery 116 is built into data printer unit 140 in this way, the configuration of switch unit 120 can be simplified, thus saving space on the camera body, and when data print unit 140 is applied to the camera, the camera body does not require large design changes. By installing battery 116 in data printer unit 140, data print tests are possible using only data print unit 140.

Figure 19:
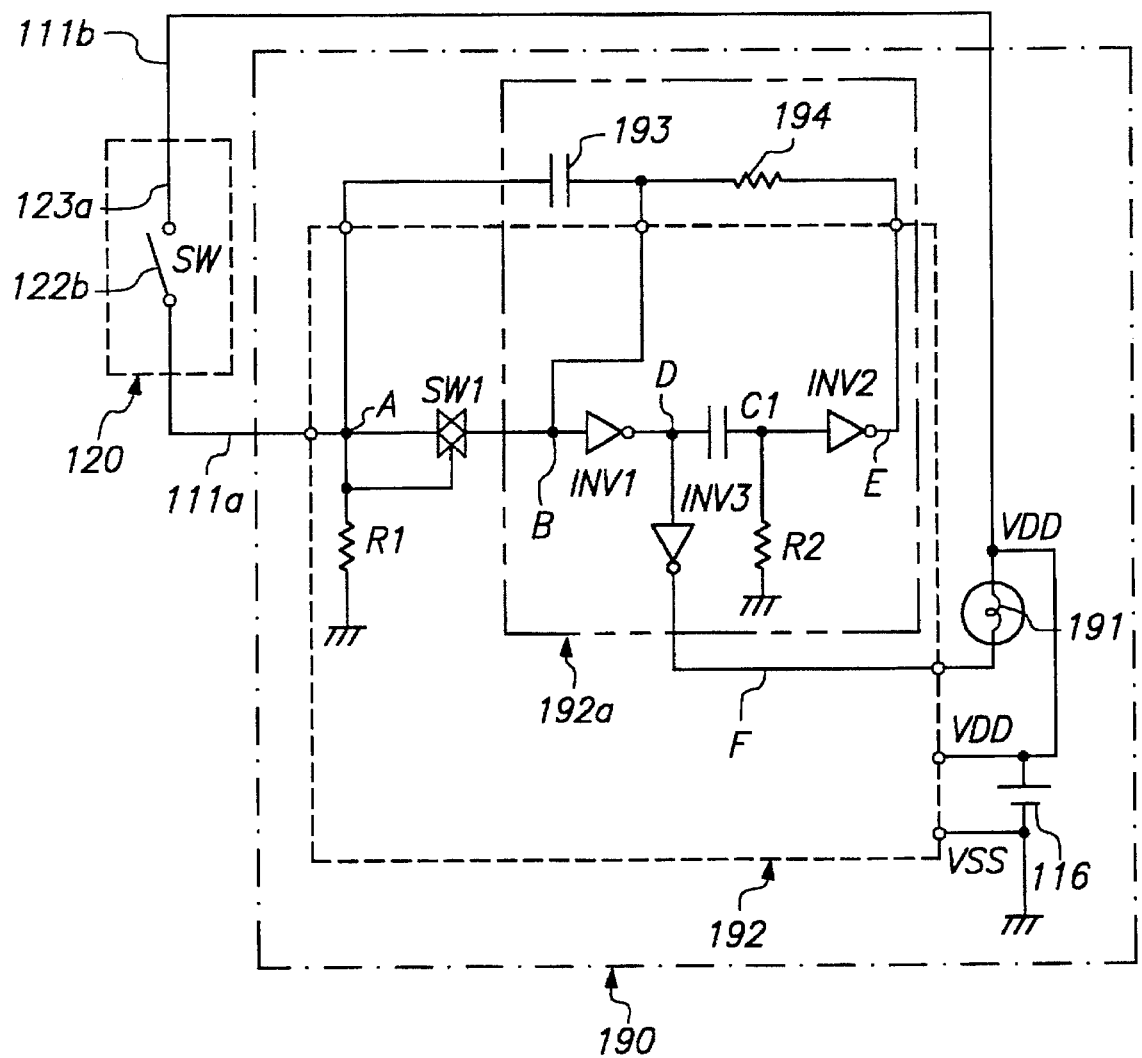
FIG. 19 is an electronic circuit diagram showing the light source illumination control circuit in the same embodiment.

FIG. 19 is a circuit diagram showing the light source illumination control circuit configuration. This circuit comprises shutter switch SW, made up of contact members 122b, 123b of switch unit 120, integrated circuit 192 of data print unit 190, resistor 194 and capacitor 193 externally attached to integrated circuit 192, tungsten lamp 191 and battery 116. Integrated circuit 192 has a monostable multivibrator 192a, an analog switch $SW_1$ and a pulldown resistor $R_1$. Monostable multivibrator 192a has inverters $INV_1$–$INV_3$, a capacitor $C_1$ and a pulldown resistor $R_2$.

Figure 20:
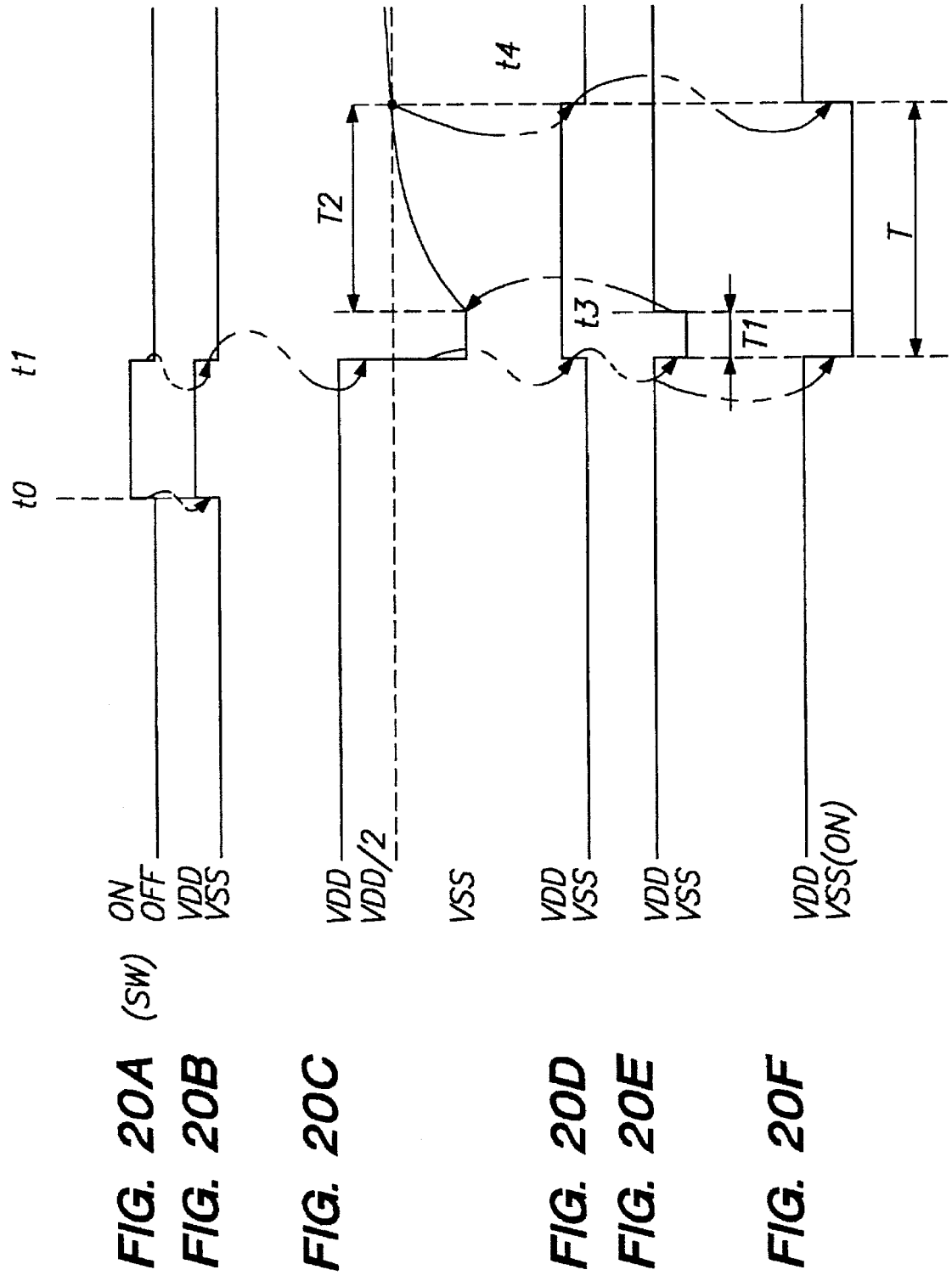
FIGS. 20A–20F depict timing chart for explaining the operation of the same light source illumination control circuit.

When shutter switch SW is open (OFF) (FIG. 20A), point A (FIG. 20B) is low and the input of inverter $INV_3$ is pulled down, and so output E (FIG. 20E) of inverter $INV_3$ is high.

Therefore, input B (FIG. 20C) of inverter $INV_1$ is high and its output D (FIG. 20D) is low, and output F (FIG. 20F) of inverter $INV_3$ is high. As a result, externally attached capacitor 193 is charged and internal capacitor $C_1$ is discharged. When shutter blade 23 rotates and shutter switch SW (FIG. 20A) is closed (ON) at time to, input A (FIG. 20B) of analog switch $SW_1$ becomes high, thus causing analog switch $SW_1$ to close, and both electrodes of capacitor 193 close and its charge is discharged while input B (FIG. 20C) of inverter $INV_1$ remains high. At time $t_1$, shutter blade 23 resets and shutter switch SW opens (OFF). Since this causes input A (FIG. 20B) to go low, input B (FIG. 20C) of inverter $INV_1$ goes low because of the zero potential difference between the two electrodes of capacitor 193 due to the lack of charge. As a result, output D (FIG. 20D) of inverter $INV_1$ becomes high and the input of inverter $INV_2$ also becomes high because of the zero potential difference between the two electrodes of capacitor $C_1$ due to the lack of charge, thus causing output E (FIG. 20E) to become low. Since this causes output F of inverter $INV_2$ to go low, tungsten lamp 191 comes on. However, capacitor $C_1$ gradually becomes charged, which drops the input level of inverter $INV_2$, and at time $t_3$, output E is inverted to a high. The time $T_1$ until this inversion is determined by the time constant of capacitor $C_1$ and resistor $R_1$. Since capacitor $C_1$ and resistor $R_1$ are formed as a semiconductor integrated circuit, the time constant is relatively small. When output E of inverter $INV_2$ becomes high, charging of externally attached capacitor 193 begins. In this charging process, input B of inverter $INV_1$ increases exponentially as shown in FIGS. 20A–20F, but when input B reaches the threshold voltage (generally $V_{DD}/2$) of inverter $INV_2$, output D inverts from a high to a low at time $t_4$. Time $T_2$ until this conversion is determined by the time constant of resistor 194 and capacitor 193. As a result, output F (FIG. 20F) of inverter $INV_2$ becomes high, thus causing tungsten lamp 191 to go off. Therefore, the illumination time of tungsten lamp 191 is the low time T ($=T_1+T_2$) of output F, and even if there should be any fluctuation in the ON period of shutter switch SW, the illumination time can be made constant. Particularly when shutter switch SW is ON, analog switch $SW_1$ quickly discharges capacitor 193, and therefore capacitor 193 can be reliably set to a no-load condition even if the ON period ($t_1$–$t_0$) of shutter switch SW, which is linked to it, is short depending on the way shutter lever 17 is depressed, thus making it possible to reliably lower the voltage of input B to a low and eliminate deviations in the illumination time.

Third Embodiment

The third embodiment is featured by the absence of a switch unit, a lamp illumination control system that performs the data print operation by manual operation and a double illumination prevention circuit.

Figure 21:
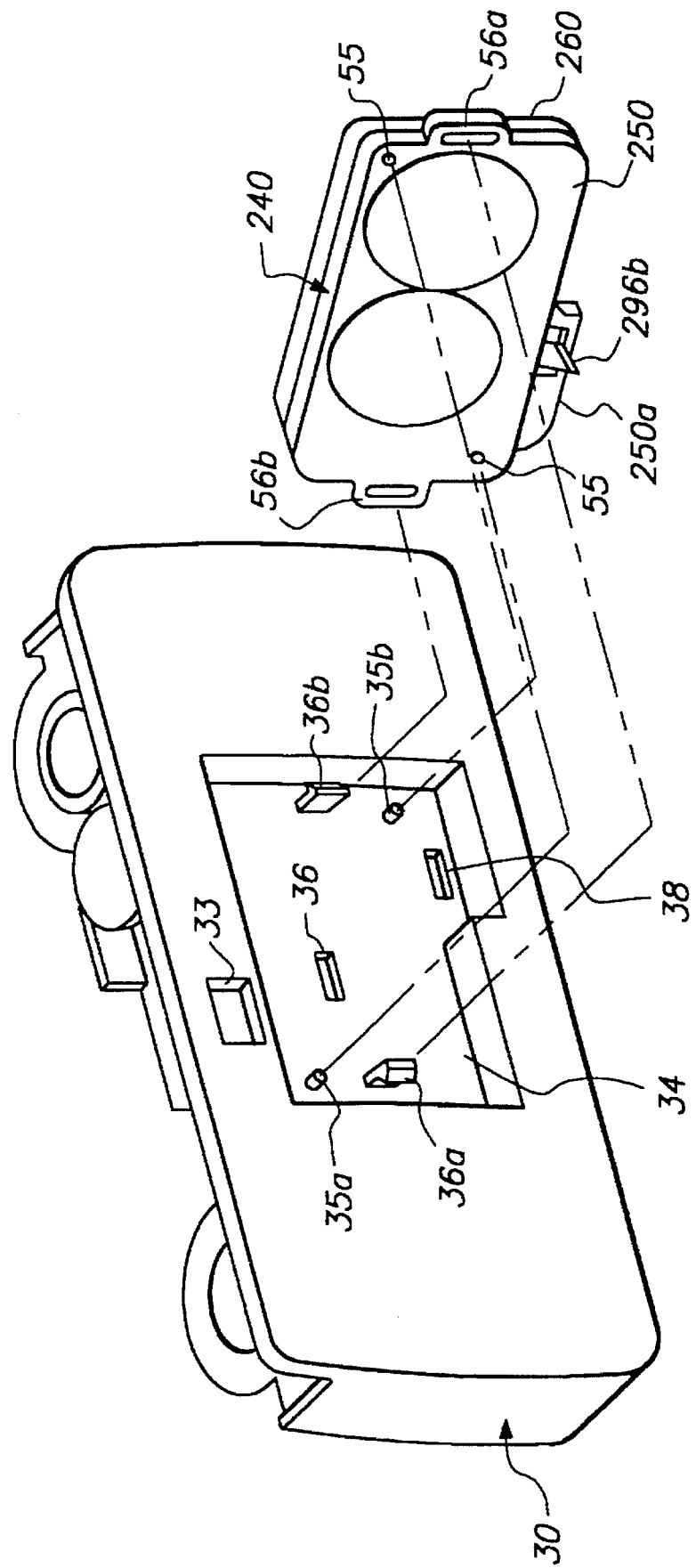
FIG. 21 is an exploded perspective view showing the camera body of a non-removable-film camera with its front case removed and equipped with the data print unit of the third embodiment of the invention and the data print unit.
Figure 22:
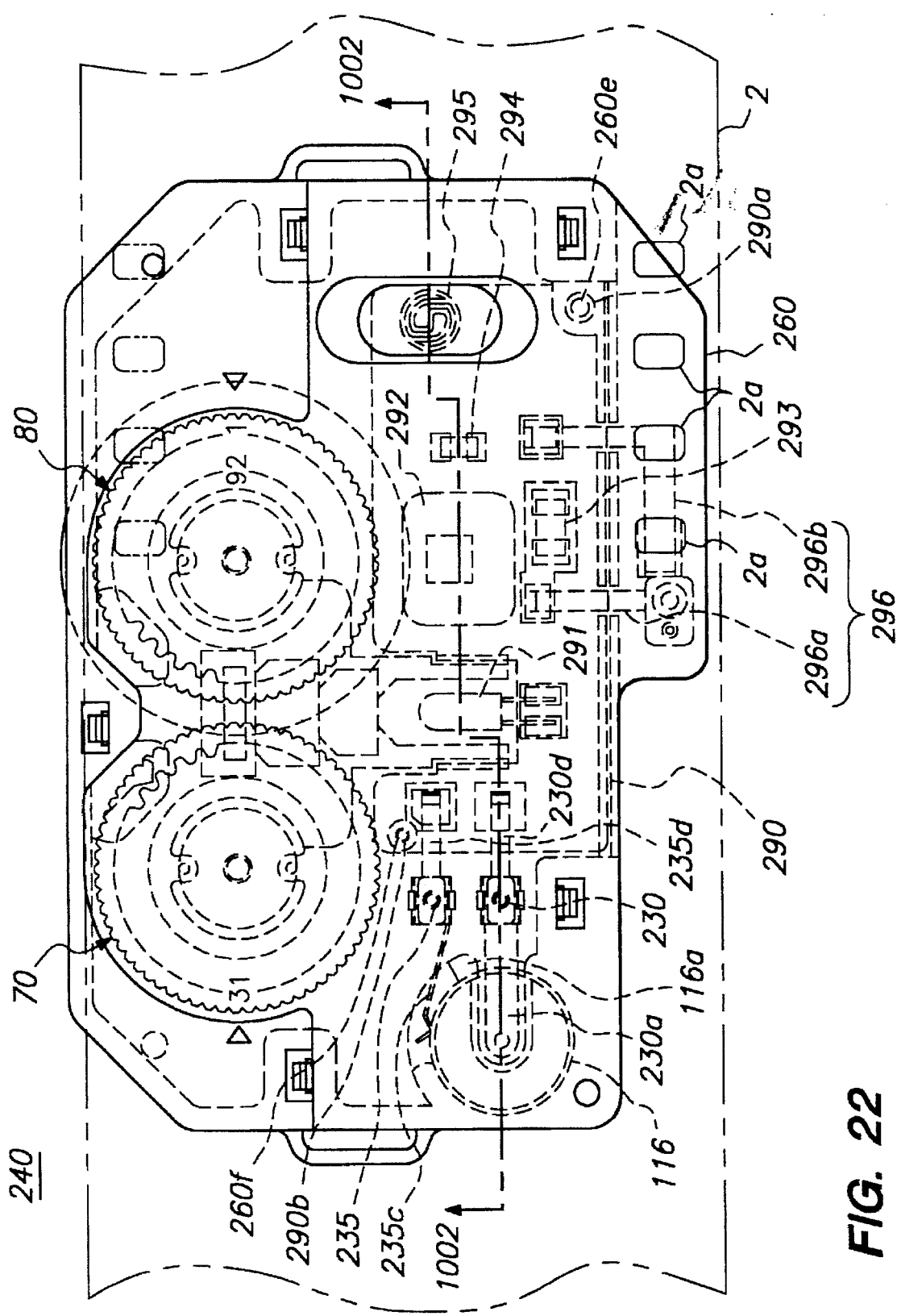
FIG. 22 is a plane view showing the same data print unit as seen from the upper frame.

In FIGS. 21–22, the same components as in the first embodiment are indicated by the same numbers, and their explanation is omitted.

As shown in FIG. 21, a recessed unit holding space 34 is formed in back case 30 of the camera body. Unlike the first and second embodiments, no groove for leading out wires is formed in unit holding space 34. This is because there is no switch unit in this embodiment. Unit holding space 34 differs from those in the first and second embodiments with respect to the formation of an insertion hole 38 for the plate spring described later. The built-in optical system, upper and lower frames 260, 250 of data print unit 240 have nearly the same configuration as in the first and second embodiments. The bottom side of upper frame 260 extends out farther than lower frame 250, and V-shaped plate spring member 296b of switch 296 for detecting film advance is mounted on the rear surface of this protruding member 250a. Data print unit 240 is fitted in this unit holding space 34 and secured.

In the internal structure of data print unit 240, data indicator wheels 70, 80, data plates 75, 85 and the data selection mechanism have a configuration similar to that of the first embodiment, but the components mounted on circuit board 290 and the housing structure for battery 116 are different. Circuit board 290 is sandwiched between upper and lower frames 260, 250. Battery 116, tungsten lamp 291 used as a light source, integrated circuit 292, capacitor 293, resistor 294, etc., are mounted on circuit board 290. Copper foil electrodes and wiring pattern are formed where required on the surface of circuit board 290. Lamp 291, capacitor 293 and resistor 294 are soldered to the electrodes. Integrated circuit 292 is connected to circuit board 290 by wire bonding in the case of a bare chip and is soldered in the case of a packaged IC. Tungsten lamp 291 offers good exposure quality compared to a light-emitting diode since it emits light over the entire wavelength band, but because its brightness fluctuates greatly, the resistance value of resistor 294 that determines the length of illumination time is ranked, and the illumination time is adjusted by attaching a resistor of a rank corresponding to the brightness of lamp 291, whereby the amount of light for printing is maintained constant. Dowel holes 290a, 290b are formed in circuit board 290, and these are positioned on dowels 260e, 260f on the upper frame and fitted on them.

Figure 23:
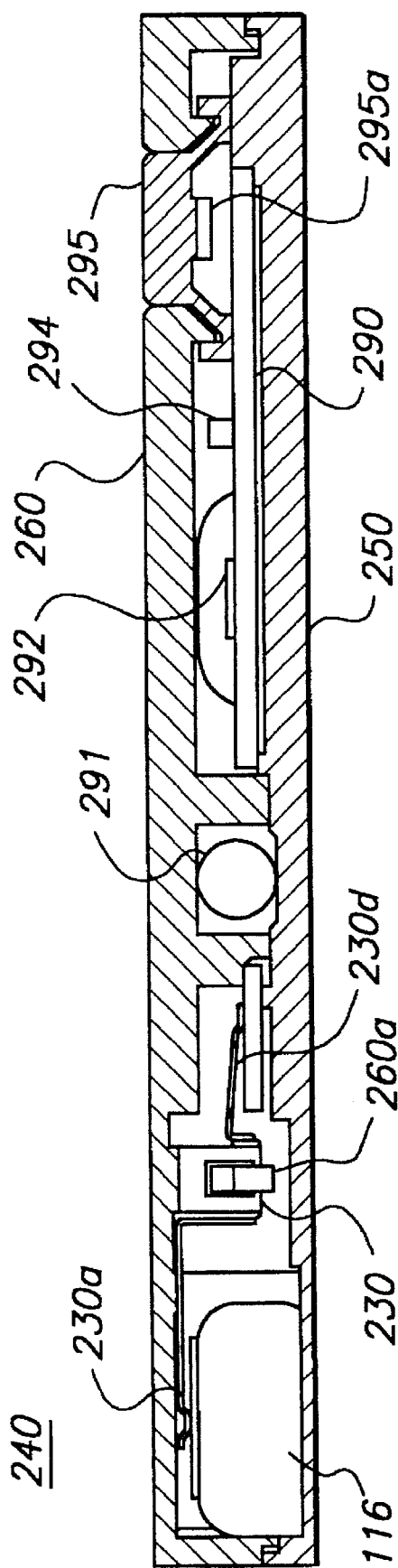
FIG. 23 is a cut plane view showing the cut plane along line 1002 in FIG. 22.
Figure 24:
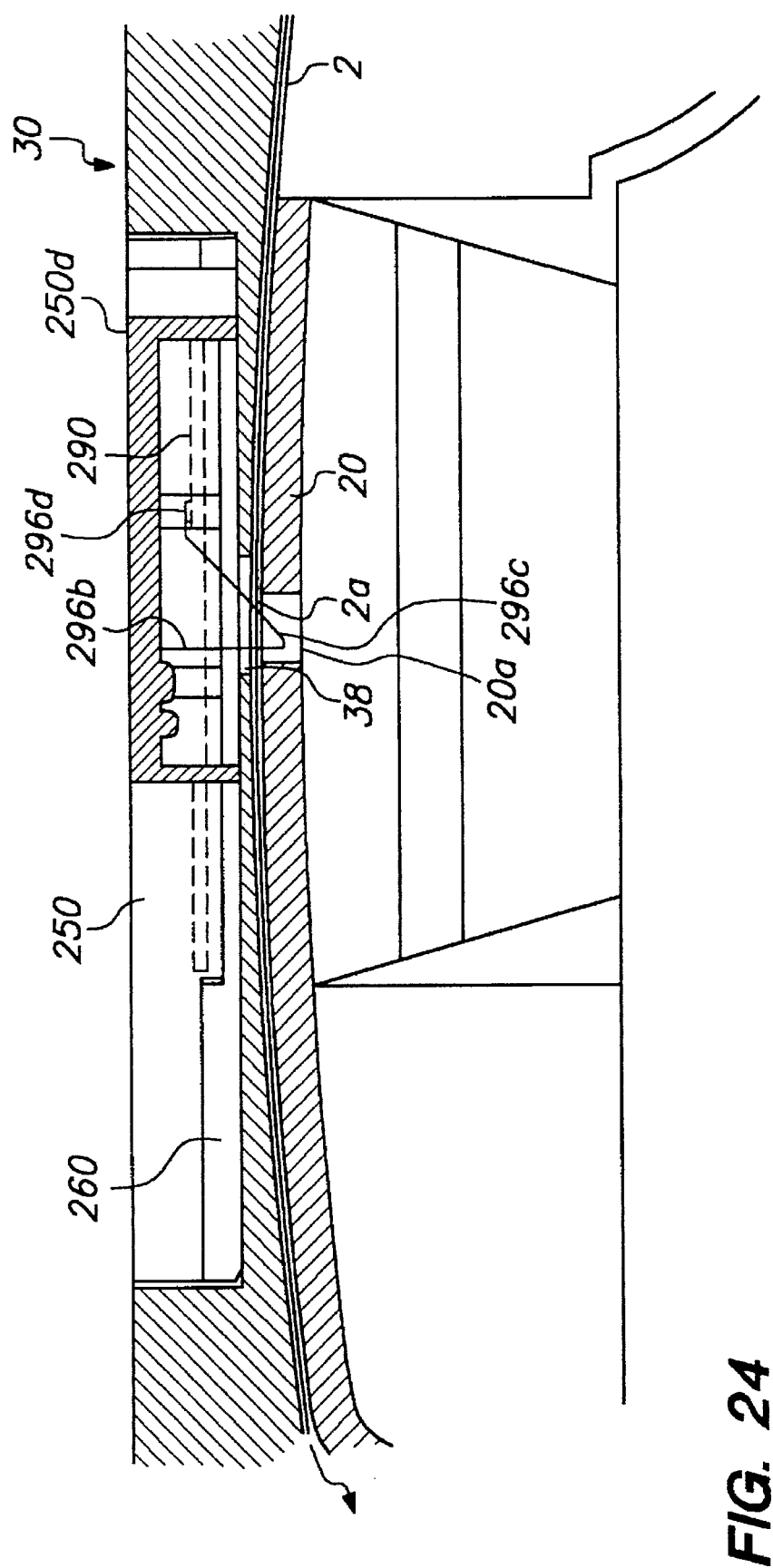
FIG. 24 is cross section showing the switching mechanism for detecting film advance in the same data print unit.

Referring to FIGS. 22–23, push-button switch 295 for lamp illumination is provided on upper frame 260 of data print unit 240. Contact 295a of push-button switch 295 opens and closes the lamp illumination system circuit of circuit board 290. The rear surface of protruding member 250a of upper frame 260 is provided with a switch 296 for detecting film advance and comprising two plate spring members 296a, 296b as shown in FIGS. 22–24. The end of one of plate spring members 296a is in constant contact with the circuit pattern on circuit board 290. The other plate spring member 296b has a V-shaped curved member 296c like that shown in FIG. 24, and curved member 296c falls in insertion hole 38 in back case 30 and is inserted in sprocket holes 2a of photographic film 2 and hole 20a in middle case 20. As a result, since photographic film 2 moves in the direction of the arrow in FIG. 24 in the film advance process, V-shaped curved member 296c repeatedly moves up and down in perforation holes 2a at the edge of photographic film 2. This up-and-down motion of V-shaped curved member 296c causes a repeated contact/non-contact condition between end 296d and the circuit pattern.

Figure 25:
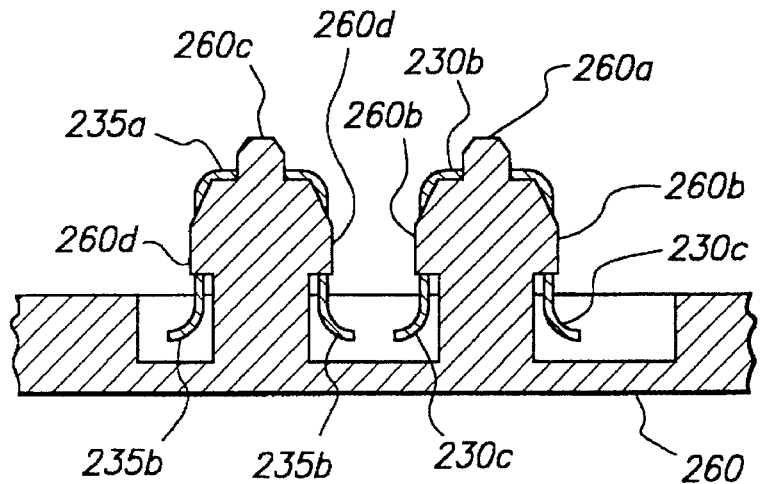
FIG. 25 is a cross section showing the attached condition of the switch plate in the same switch unit.

Battery 116 is held in place by rib 116a formed in upper frame 260 so that it surrounds battery 116, plate spring 230a of negative electrode plate 230 and lower frame 250. As shown in FIG. 25, negative electrode plate 230 has a dowel hole 230b that is positioned on dowel 260a formed in upper frame 260, and hooks 230c are formed on both sides of dowel hole 230b. Hooks 230c engage protrusions 260b on upper frame 260. Negative electrode plate 230 has a plate spring 230d that comes into elastic contact with negative electrode of circuit board 290. Positive electrode plate 235 has a dowel hole 235a that is positioned on dowel 260c formed in the upper frame, and hooks 235b are formed on both sides of dowel hole 235c. Hooks 235b engage protrusion 260d on upper frame 260. Positive electrode plate 235 has a plate spring member 235c that protrudes out one side and comes in elastic contact with the side surface of the battery as well as a plate spring member 235d that protrudes out the other side and comes in elastic contact with the positive electrode of circuit board 290. Since battery 116 is built into data print unit 140 and there is no switch unit as there is in the first and second embodiments, the only changes required in the camera body in order to apply data print unit 240 are a by-pass hole 20a in middle case 20 and a unit holding space 34 in back case 30 and no extensive design change in existing structures is required. Also, by mounting battery 116 in data print unit 240, data print tests can be performed with only data print unit 240 as in the second embodiment.

Figure 26:
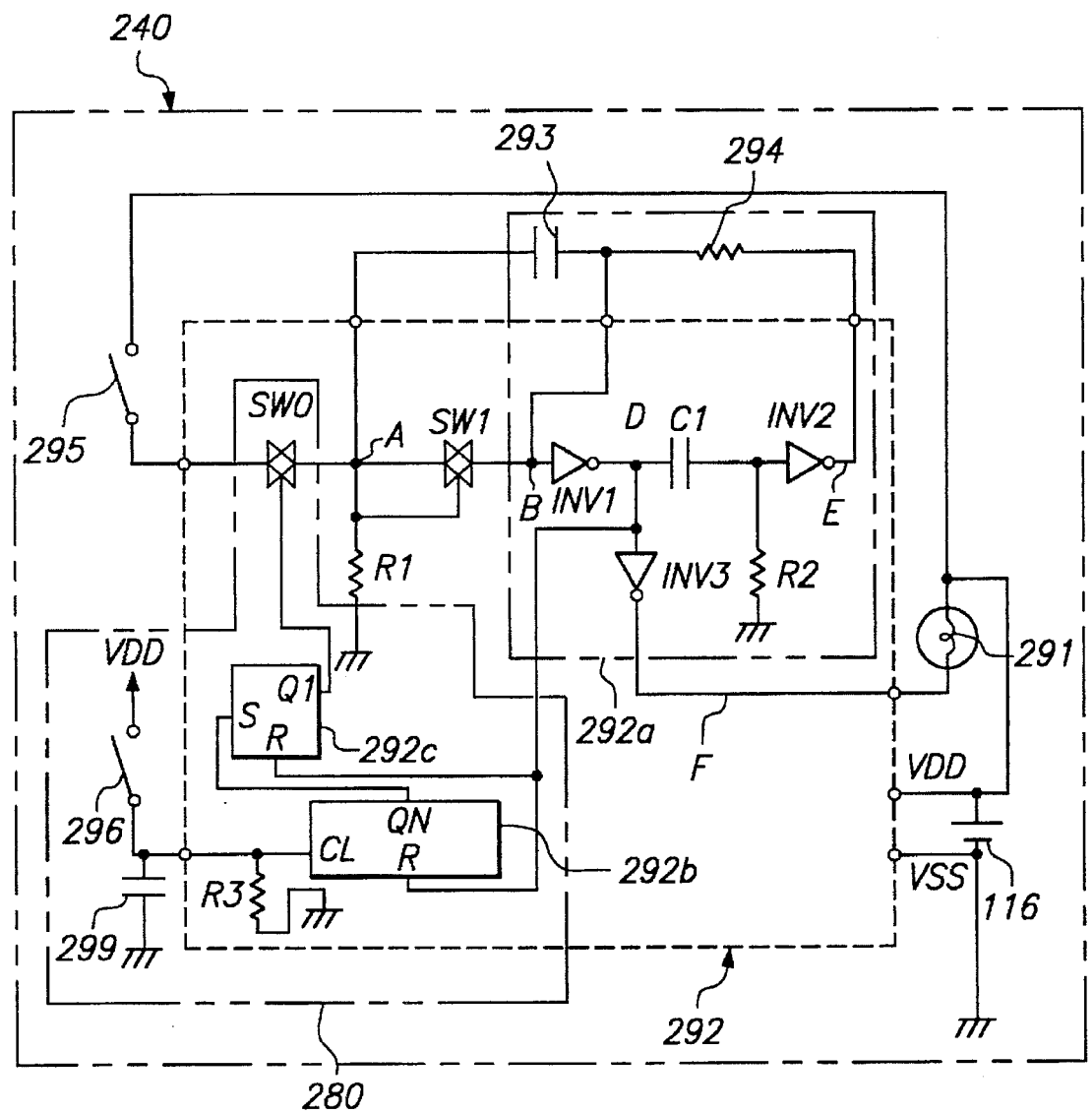
FIG. 26 is an electronic circuit diagram showing the light source illumination control circuit in the same embodiment.
Figure 28:
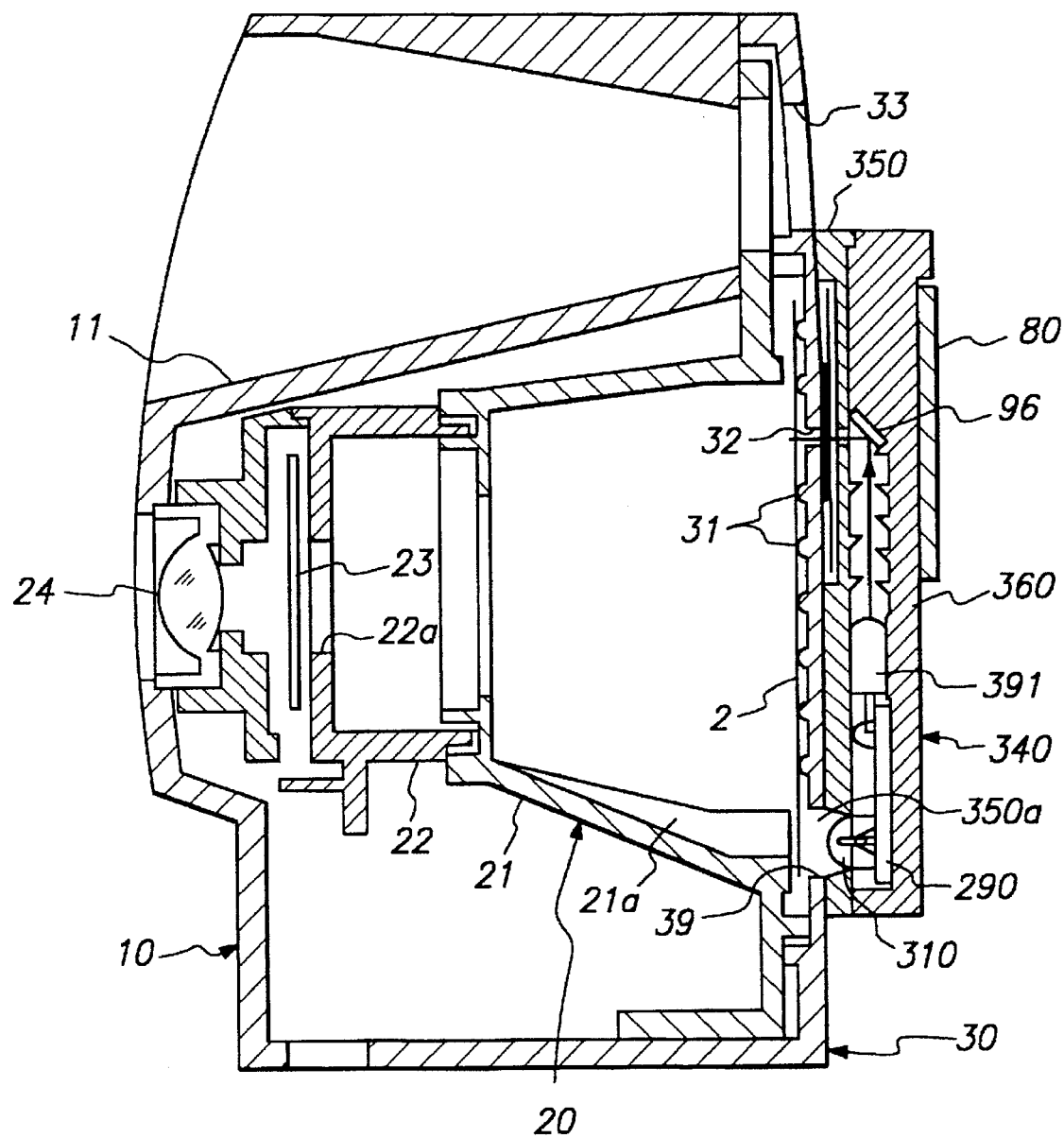
FIG. 28 is a longitudinal sectional side view showing a non-removable-film camera equipped with the data print unit of the fourth embodiment of the invention.

FIG. 26 is an electronic circuit diagram showing the configuration of the illumination circuit and the double illumination prevention circuit of the data print unit of this embodiment. This circuit comprises push-button switch 295 for illumination, detection switch 296 for film advance, integrated circuit 292, resistor 294 and capacitor 293 externally attached for integrated circuit 292, tungsten lamp 291, battery 116 and capacitor 299 for preventing chatter. Integrated circuit 292 comprises monostable multivibrator 292a, analog switches $SW_0$, $SW_1$, pulldown resistors $R_1$, $R_3$, counter 292b and set-reset flip-flop 292c. Monostable multivibrator 292a has inverters $INV_1$–$INV_3$, capacitor $C_1$ and pulldown resistor $R_2$.

When photographic film 2 is not advanced and push-button 296 (FIG. 27A) is open (OFF), point A (FIG. 27E) is pulled down by resistor $R_1$, and therefore, as shown in FIG. 27, point A is low (i.e., $V_{SS}$), and also since the input of inverter $INV_3$ is pulled down by resistor $R_2$, output E (FIG. 27H) of inverter $INV_3$ is high (i.e., $V_{DD}$). Therefore, input B (FIG. 27F) of inverter $INV_1$ is high and its output D (FIG. 27G) is low, and output F (FIG. 27I) of inverter $INV_3$ is high. As a result, externally attached capacitor 293 is charged, while internal capacitor $C_1$ is discharged. Next, when the film advance knob is turned and photographic film 2 is advanced when shooting a picture, V-shaped curved member 296c of switch 296 for film advance detection repeatedly enters and comes out of perforation holes 2a resulting in an up-and-down motion. As shown in FIGS. 27A–27F switch 296 switches ON and OFF after a prescribed number of times. Since there are generally eight perforation holes per frame in 35 mm cameras, eight pulses are impressed on clock input CL of counter 292 by one complete film advance operation. When the eighth (generally Nth) pulse rises, QN (FIG. 27B) output of counter 292 rises from a low to a high. The rise of this QN output raises set terminal S of flip-flop 292c, and therefore, as shown in FIG. 27C, the Q1 output changes from low to high. This causes analog switch $SW_0$ to close so that its input is transferred to the output side. When push-button 295 (FIG. 27D) is manually pressed at time $t_0$, analog switch $SW_1$ closes, input B (FIG. 27F) of inverter $INV_1$ remains high and both electrodes of capacitor 293 close, resulting in its discharge. When push-button 295 (FIG. 27D) is reset to an OFF condition at time $t_1$, input A (FIG. 27E) returns to a low and analog switch $SW_1$ opens. Here, since input A is dropped low, input B of inverter $INV_1$ is dropped to a low because of the zero potential difference between the two electrodes of the capacitor due to the lack of charge. As a result, output D (FIG. 27G) of inverter $INV_1$ becomes high, and since the input of inverter $INV_2$ goes high, because of the zero potential difference between the electrodes of capacitor $C_1$ due to the lack of charge, output E (FIG. 27H) goes low. Also, both counter 292b and flip-flop 292c are reset. Since the transition of output E to a low causes output F (FIG. 27I) of inverter $INV_2$ to become low, tungsten lamp 291 comes on. However, capacitor $C_1$ gradually becomes charged, and therefore the input level of inverter $INV_2$ drops and its output E eventually inverts to a high at time $t_3$. The time period $T_1$ until this inversion is determined by the time constant of capacitor $C_1$ and resistor $R_1$. Since capacitor $C_1$ and resistor $R_1$ are formed as a semiconductor integrated circuit, their time constant is relatively small. When output E (FIG. 27H) of inverter $INV_2$ becomes high at time $t_3$, charging of externally attached capacitor 293 begins. In this charging process, input B of inverter $INV_1$ rises exponentially as shown in FIG. 27F, but when input B reaches the threshold voltage (generally $V_{DD}/2$) of inverter $INV_2$, output D (FIG. 27G) inverts from high to low at time $t_4$. The time period $T_2$ up until inversion is determined by the time constant of resistor 294 and capacitor 293. As a result, output F (FIG. 27F) of inverter $INV_2$ becomes high, thus causing tungsten lamp 291 to switch off. Therefore, the illumination time of tungsten lamp 291 is the low time T (=$T_1+T_2$) of output F, and the illumination time can be kept constant even if there should be some deviation in the ON period of push-button switch 295. Particularly when push-button switch 295 is ON, analog switch $SW_1$ quickly discharges capacitor 293 instantaneously, and therefore even if the ON period ($t_1$–$t_0$) is instantaneous depending on how push-button switch 295 is depressed, capacitor 123 can be reliably set to a non-charge condition, thus making it possible to reliably drop the voltage of input B low (i.e., $V_{SS}$) and eliminating deviations in the illumination time. This illumination circuit is not linked to the shutter blade of the camera body, but rather lamp 291 is illuminated by depression of push-button switch 295. Therefore, it is necessary to provide a double-illumination prevention function. The double-illumination prevention function of this embodiment is achieved with the film advance detection circuit. Film advance detection circuit 280 comprises switch 296 for film advance detection, counter 292b, flip-flop 292c and analog switch $SW_0$. When no, or an incomplete film advance operation is performed, the Q1 (FIG. 27C) output of flip-flop 292c is low because the QN (FIG. 27B) output of counter 292b is low. Therefore, since analog switch $SW_0$ is OFF, the high level of the input does not reach output A even when push-button switch 295 is switched ON at time $t_5$. Therefore, double illumination is prevented.

Fourth Embodiment

This embodiment features a configuration in which the light source of the data print unit is caused to emit light for a prescribed period of time by a photosensor receiving light from the subject when the picture is taken.

In FIGS. 28–32 the same components in this embodiment as in the first embodiment are designated by the same numbers and their explanation is omitted here.

Figure 29:
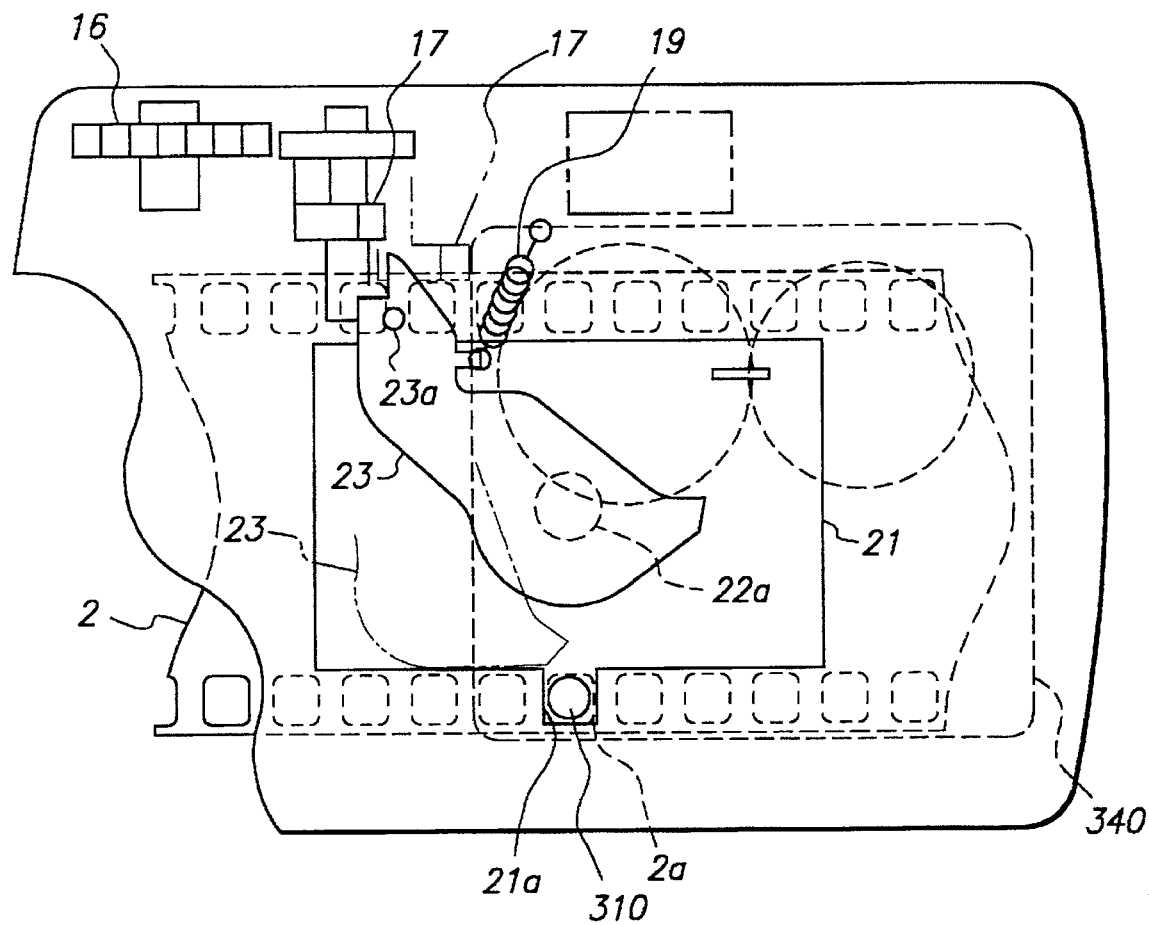
FIG. 29 is front view showing the same non-removable-film camera.
Figure 30:
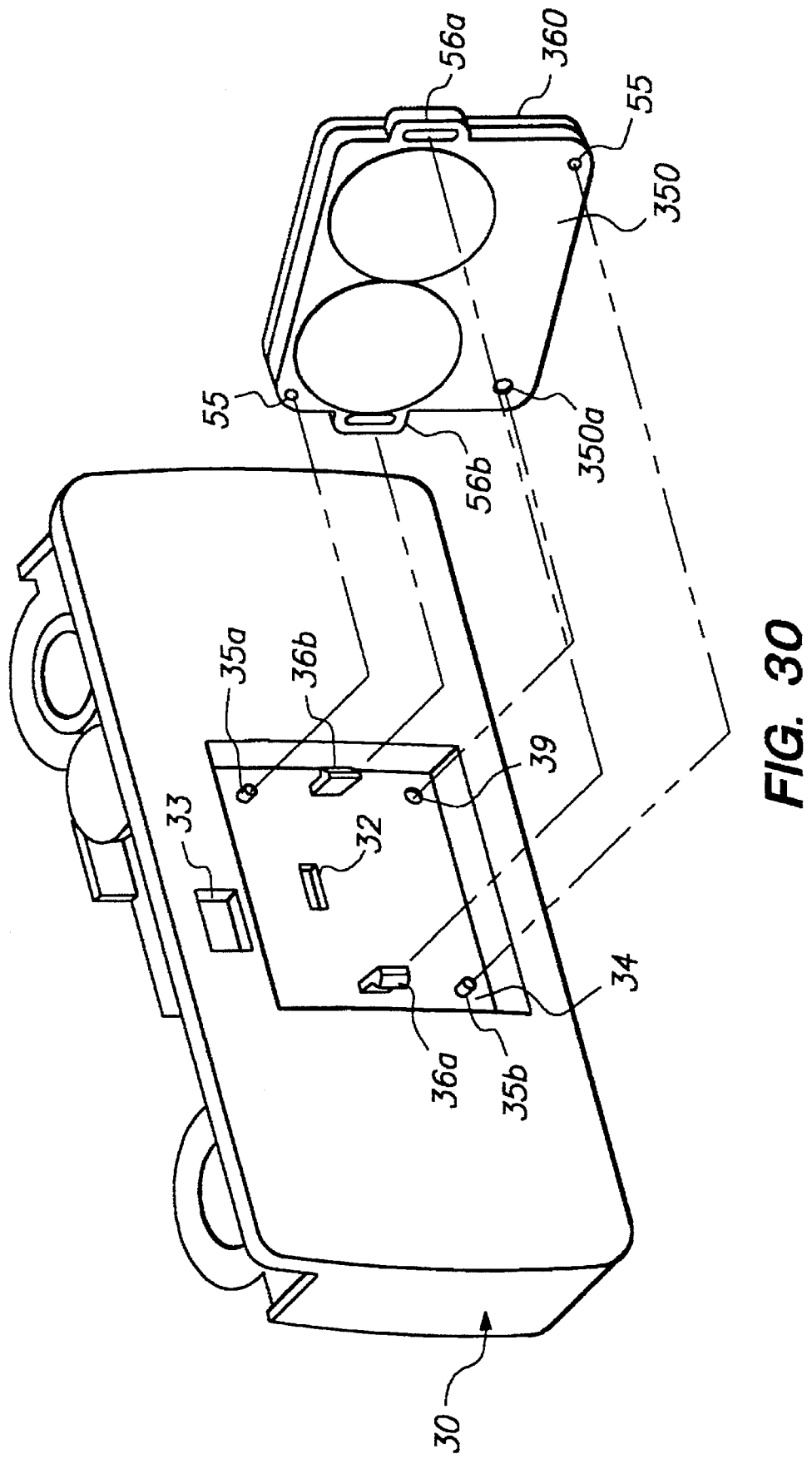
FIG. 30 is an exploded perspective view showing the camera body of the same non-removable-film camera with its front case removed and the data print unit.
Figure 31:
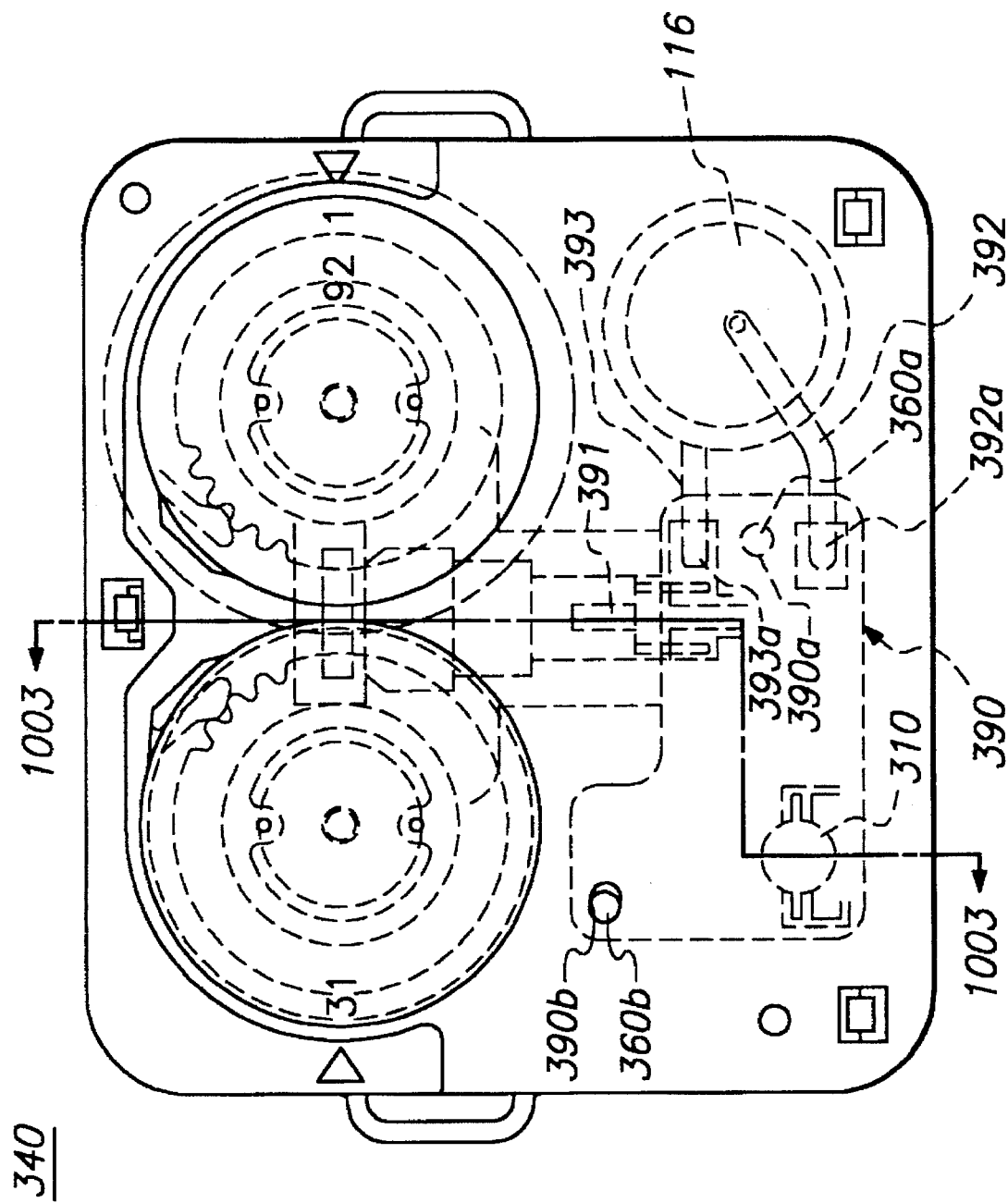
FIG. 31 is a plane view showing the same data print unit as seen from the top frame.

Light guide cylinder 21 of middle case 20 in the camera body of this embodiment has a sensor light guide path 21a in its lower part, and in the lower part of the surface of back case 30 that comes in contact with the film is a transmission hole 39 that leads part of the subject light that passes through sensor light guide path 21a to photosensor 310. Transmission hole 39 is positioned so that it lines up with perforation holes 2a of the film and is formed in the corner of unit holding space 34. On lower frame 350 of the data print unit is formed a sensor window 350a disposed opposite transmission hole 39. As shown in FIG. 29, when shutter lever 17 is depressed upon completion of manual rotation of film advance knob 16, the shutter blade is rotated on axis 23a from the position of the solid line in FIG. 29 to the position of the double-dashed line, transmission light hole 22a is opened and the subject is exposed on photographic film 2. At the time of this exposure, part of the subject light passes through sensor light guide path 21a, transmission hole 39 and sensor window 350a and is projected on light sensor 310.

Figure 32:
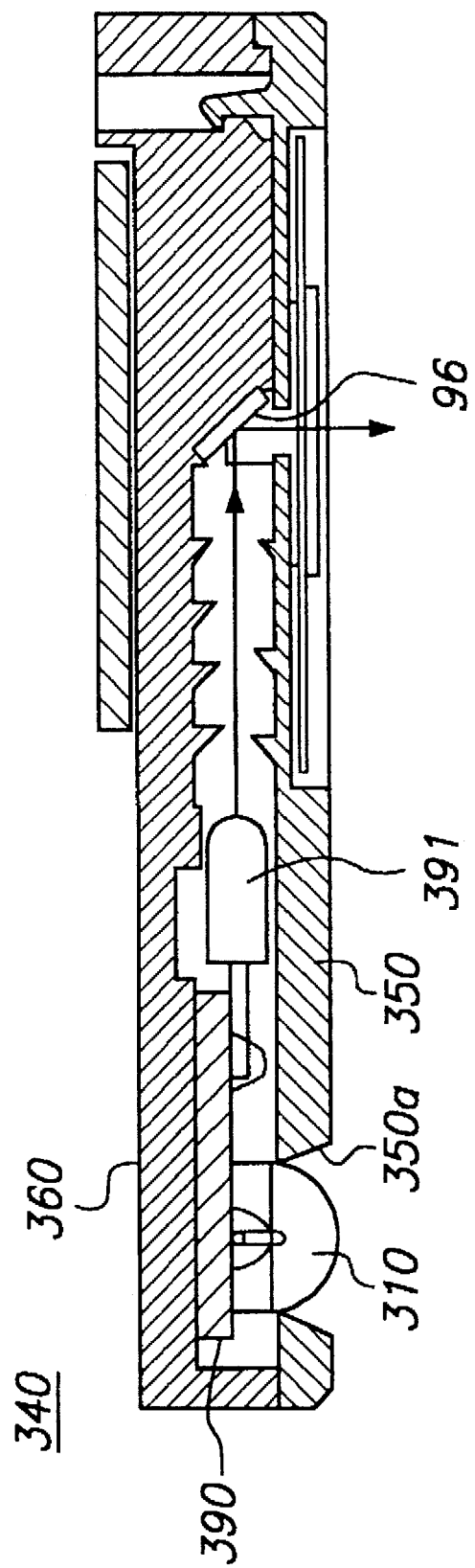
FIG. 32 is a cut plane view showing the cut plane along line 1003 in FIG. 31.

The internal structure of data print unit 340 has the same configuration as the first embodiment with respect to data indicator wheels 70, 80, data plates 75, 85 and the remaining data selection mechanism, but the components mounted on circuit board 390 and the housing structure for battery 116 are different from those in the first embodiment. Circuit board 390 is sandwiched between upper frame 360 and lower frame 350. Tungsten lamp 391, photosensor (phototransistor) 310, and electronic components described below are mounted on circuit board 390. Copper foil electrodes and a circuit pattern are formed where required on the surface of circuit board 390. Lamp 391, photosensor 310, etc., are soldered to the electrodes. Dowel holes 390a and 390b are formed in circuit board 390, and these are lined up with dowels 360a, 360b on upper frame 360 and engage them. Photosensor 310 mounted on circuit board 390 faces sensor window 350a of the lower frame as shown in FIG. 32. Battery 116 is sandwiched between plate spring type battery presser metal 392 on the positive electrode side and plate spring type battery presser metal 393 on the negative electrode side. Ends 392a, 393b of battery presser metals 392, 393 are in contact with the circuit pattern of circuit board 390.

Figure 33:
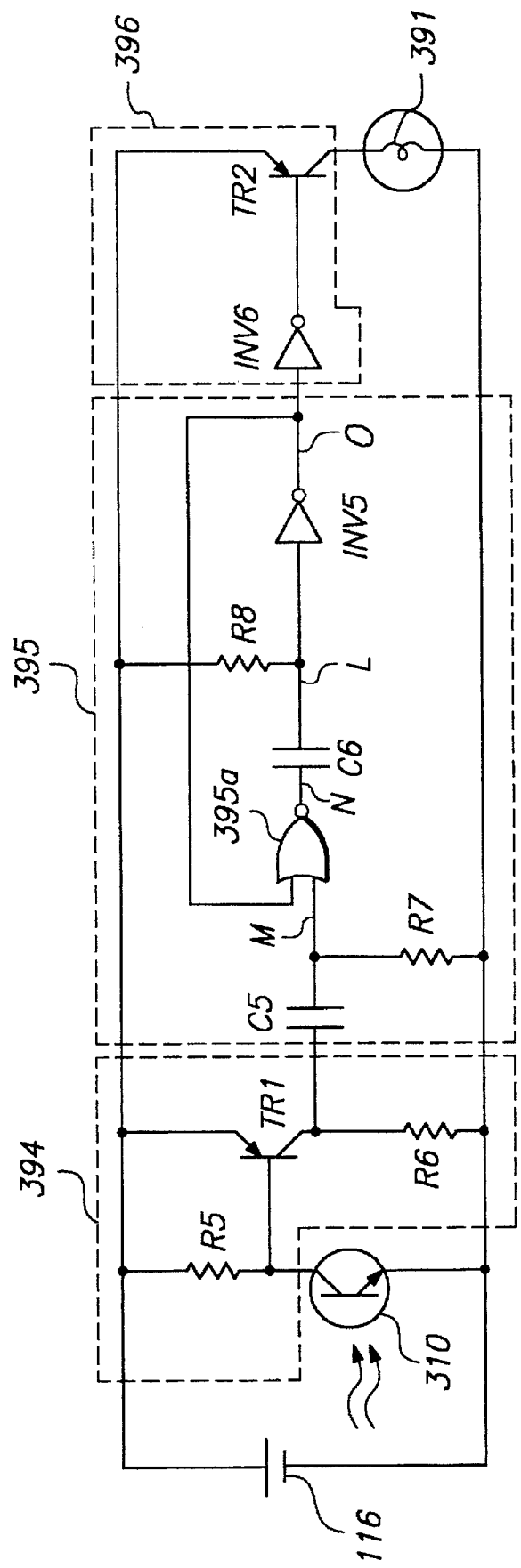
FIG. 33 is an electronic circuit diagram showing the light source illumination control circuit of the same embodiment.

FIG. 33 is an electronic circuit diagram showing the lamp illumination control circuit in the data print unit of this embodiment. This lamp illumination control circuit comprises photosensor (phototransistor) 310, battery 116, light-emitting trigger signal amplification circuit 394, monostable multivibrator 395, output circuit 396 and tungsten lamp 391. Light-emitting trigger signal amplification circuit 394 comprises load resistor $R_5$ of photosensor 310, PNP type transistor $Tr_1$ and collector resistor $R_6$. Monostable multivibrator 395 comprises high-pass capacitor $C_5$, two-input NOR gate 395a, capacitor $C_6$ for the time constant, inverter $INV_5$, pulldown resistor $R_7$ and pullup resistor $R_8$. Output O of inverter $INV_5$ is the first input of NOR gate 395a, and the second input of NOR gate 395a is pulled down via resistor $R_7$.

Output circuit 396 comprises inverter $INV_6$ and PNP transistor $Tr_2$.

While photosensor 310 is not receiving light, its output O (FIG. 34D) is low (i.e., $V_{SS}$) because input L (FIG. 34C) of inverter $INV_5$ is made high (i.e., $V_{DD}$) via pullup resistor $R_8$. Therefore, the first input of NOR gate 395a is also low, and since second input M of NOR gate 395a is made low by pulldown resistor $R_7$, output N (FIG. 34B) of NOR gate 395a is high. As a result, capacitor $C_6$ remains in an uncharged state since both electrodes are high. When shutter level 17 is depressed and part of the subject light is received by photosensor 310, the voltage drop in load resistor $R_5$ causes transistor $Tr_1$ to come ON and a positive trigger pulse appears at its collector. This trigger pulse passes through high-pass capacitor $C_5$. A trigger pulse like that shown in FIG. 34A which rises at time $t_0$ is impressed on second input M of NOR gate 395a. When the potential of the trigger pulse exceeds the threshold value of NOR gate 395a at time $t_1$, output N of NOR gate 395a inverts to a low. This inversion of output N to a low pulls input L of inverter $INV_5$ down to a low because capacitor $C_6$ is in a non-charged state. This causes output O of inverter $INV_5$ to change from a low to a high. Even if second input M of NOR gate 395a should return to a low at this time (even if the light receiving period is instantaneous), output N of NOR gate 395a is maintained low and capacitor $C_6$ continues to be charged because the first input of NOR gate 395a has become high. Also, capacitor $C_6$ is gradually charged by the time constant determined by capacitor $C_6$ and pullup resistor $R_8$. When this happens, input L of inverter $INV_5$ rises exponentially from a low to a high as shown in FIG. 34, but when it reaches the threshold value (generally $V_{DD}/2$) of inverter $INV_5$ at time $t_3$, output O of inverter $INV_5$ inverts from a high to a low. Since this inversion sets output N of NOR gate 395a high, capacitor $C_6$ is discharged and input L of inverter $INV_5$ becomes high. In this way, the generation of trigger pulse M maintains output O of inverter $INV_5$ at a high for only the time period T determined by capacitor $C_6$ and pullup resistor $R_8$. As a result, lamp 391 illuminates for only light-emitting time period T. Also, even if there should be deviations in the period during which trigger pulse M is generated (deviations in the period during which the shutter lever is depressed), light emission is reliably obtained for only time period T once the trigger pulse is generated.

Figure 35A:
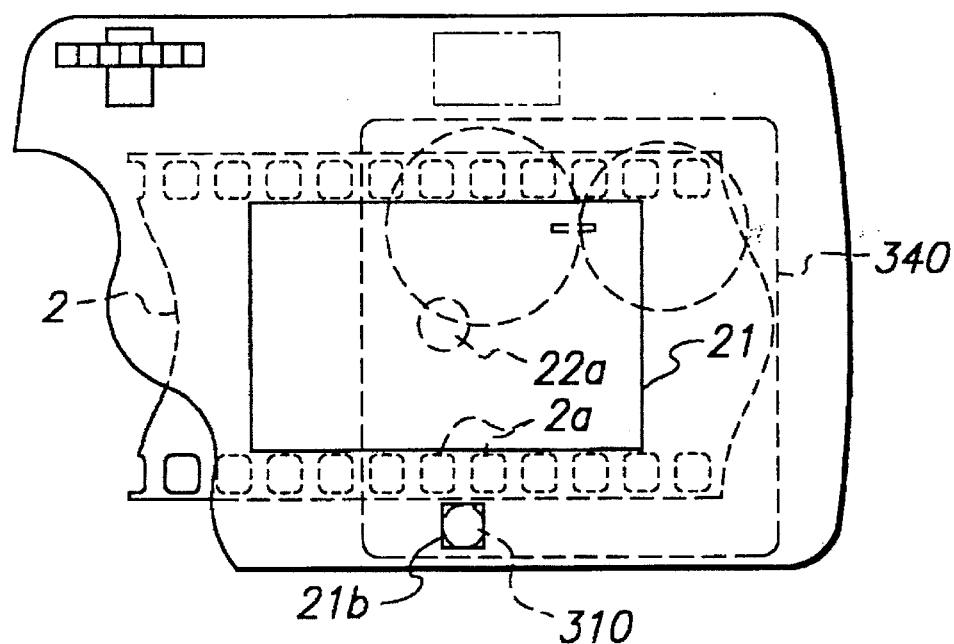
FIGS. 35A–35B are plane views showing modifications of the same embodiment.
Figure 35B:
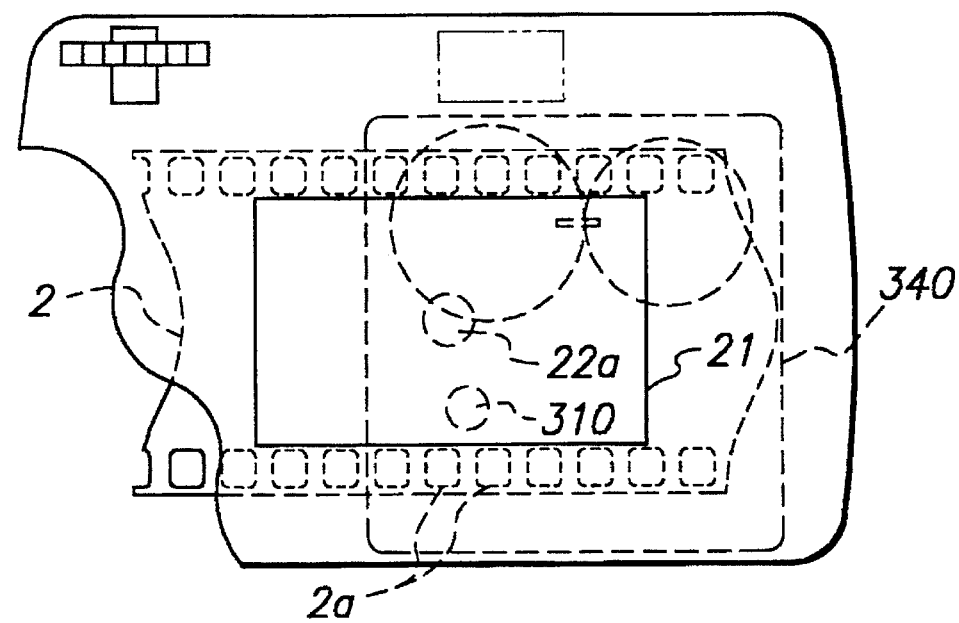
Figure 36:
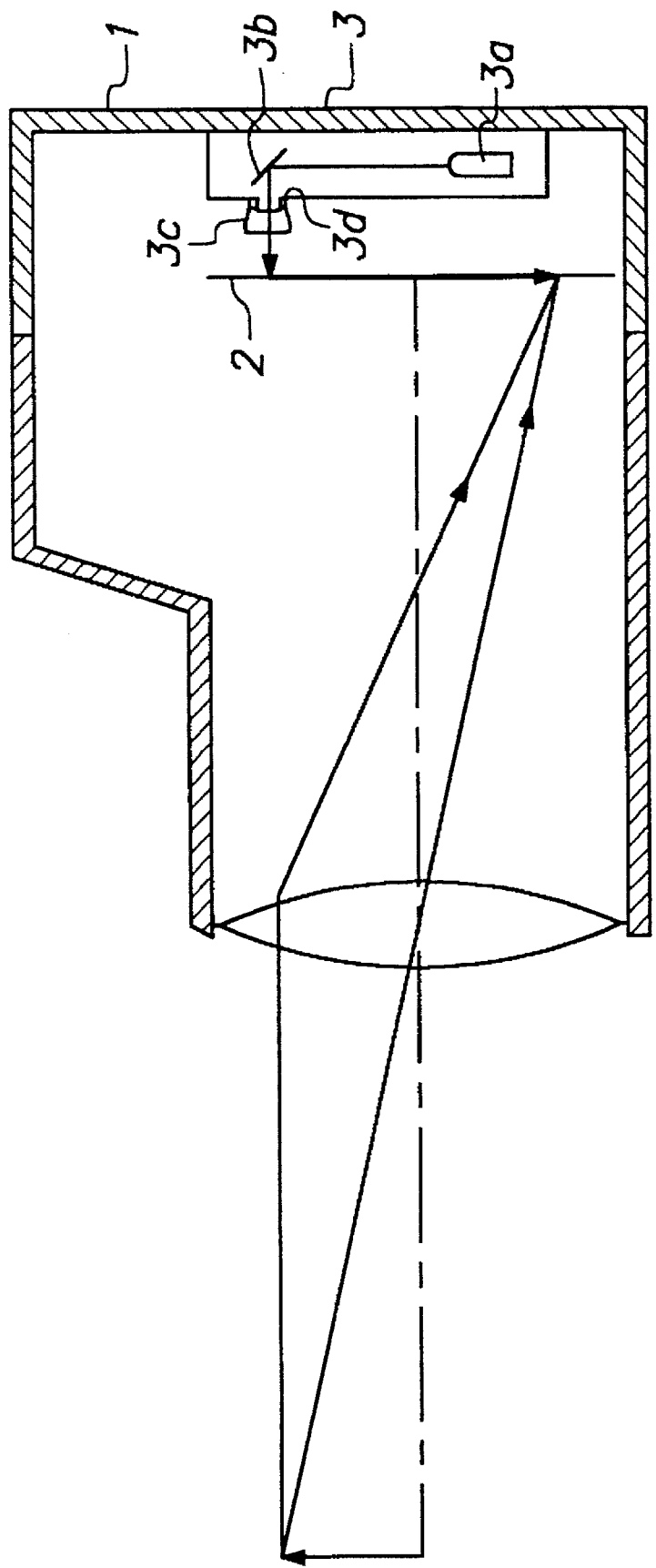
FIG. 36 is a longitudinal sectional side view showing a camera equipped with a prior art data print unit with a built-in transmission type liquid crystal display element.

In this configuration, sensor light guide path 21a in the lower part of light guide cylinder 21 is disposed such that it overlaps perforation holes 2a in the photographic film, but it is sufficient that the position where sensor light guide path 21a is disposed be where part of the subject light arrives. FIGS. 35A and 35B depict a front view of the non-removable-film camera of a modification of this embodiment. In the modification shown in FIG. 35(A), a dedicated sensor light guide path 21b is formed independent of light guide cylinder 21 of middle case 20 at a position where it does not overlap photographic film 2. In the modification shown in FIG. 35B, a structure is employed in which light guide cylinder 21 itself also serves as the sensor light guide path. In this case, light arriving at photosensor 310 is light that has passed through photographic film 2, and therefore the illumination of the light received on photosensor 310 is inferior to that in the modification in FIG. 35(A). However, there is no need to change middle case 20 of the camera body, and only unit holding space 34 in back case 30 with a transmission hole need be changed. Since the current used by the light source illumination control circuit is extremely small when the lamp is not on, it can be operated for long periods on a single battery. Further, since no elements that require high voltage are used, operation is possible with a 1.5-volt power source. Also, since the number of elements is small and no expensive elements are used, the circuit configuration is inexpensive.

In this embodiment, year-month-day date data were used as the print data, but they are not limited to this, and print units with data plates on which the names of scenic spots, places of historical interest and other locations, symbols such as a heart or star or other suitable data are affixed can be realized. Also, it is possible to have the user select the print unit and allow him to easily attach it to the non-removable-film camera.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, and applications as may fall within the spirit and scope of the subjoined claims.

What is claimed is:

1. A data print unit comprising:
   a) an assembled unit having an inner surface and an outer surface, and comprising a lower frame having a light transmission hole, and an upper frame;

b) a light source for emitting light and disposed within said assembled unit;
c) an optical means that projects the light emitted from said light source through said light transmission hole;
d) at least one removable print data plate having multiple data sections at positions equidistant from its rotational center; and
e) at least one data indicator wheel positioned on said outer surface of said assembled unit for rotation with respect to said assembled unit, comprising:
1) a flange having a plurality of data indicator sections corresponding to said data sections on said print data; and
2) a central axial member passing through a corresponding axial hole in said assembled unit and extending into detachable, frictional engagement with said print data plate to selectively align said data sections of said removable print data plate with said light transmission hole, wherein said removable print data plate is removably attached to an end of said axial member by means of a flanged pin.

2. A data print unit comprising:
a) an assembled unit having an inner surface and an outer surface, and comprising a lower frame having a light transmission hole, and an upper frame;
b) a light source for emitting light and disposed within said assembled unit;
c) an optical means that projects the light emitted from said light source through said light transmission hole;
d) at least one removable print data plate having multiple data sections at positions equidistant from its rotational center;
e) at least one data indicator wheel positioned on said outer surface of said assembled unit for rotation with respect to said assembled unit, comprising:
1) a flange having a plurality of data indicator sections corresponding to said data sections on said print data; and
2) a central axial member passing through a corresponding axial hole in said assembled unit and extending into detachable, frictional engagement with said print data plate to selectively align said data sections of said removable print data plate with said light transmission hole; and
f) a ratchet gear on a surface of said flange, said data indicator wheel having a groove on its inner circumference between said axial member and said ratchet gear, said upper frame having a cylindrical projecting member around an edge of said axial hole for engagement with said groove during assembly.

3. The data print unit of claim 2 wherein the removable print data plate comprises a disk-shaped first print data plate and a disk-shaped second print data plate, and the data indicator wheel comprises a first data indicator wheel corresponding to the first print data plate and a second data indicator wheel corresponding to the second print data plate.

4. The data print unit of claim 3 wherein the first print data plate and the second print data plate are disposed within said assembled unit so that parts of each of said print data plates overlap one another and said there is a light transmission hole in facing relation to said overlapping parts.

5. The data print unit of claim 4 wherein said light transmission hole comprises a first light transmission hole in facing relation to data sections on the first print data plate and a second light transmission hole in facing relation to data sections on the second print data plate, said first and second light transmission holes separated by a shielding partition.

6. The data print unit of claim 5 wherein the first print data plate data sections comprise year-month data and the second print data plate data sections comprise day data.

7. The data print unit of claim 5 wherein both said first and said second print data plates have an opaque non-data section.

8. A non-removable-film camera having photographic film, comprising:
a) a data print unit comprising
A1) an assembled unit having an inner surface and an outer surface, said assembled unit comprising a lower frame having a light transmission hole, and an upper frame;
A2) a light source for emitting light and disposed within said assembled unit;
A3) at least one removable print data plate having multiple data sections at positions equidistant from its rotational center;
A4) at least one data indicator wheel having a flange with a plurality of data indicator sections corresponding to said data sections on said print data plate;
A5) an optical means that projects the light emitted from said light source through said light transmission hole;
A6) said data indicator means that projects the light emitted from said light source through said light transmission hole;
A7) said removable print data plate removably attached to said assembled unit so that each of said data sections are selectively aligned with said light transmission hole;
b) a camera body having a data light transmission hole formed on a surface thereof, said data print unit detachably mounted to said surface of said camera body so that said camera body data light transmission hole is aligned with said assembled unit lower frame light transmission hole;
c) an illumination control circuit for control of said light source;
d) a shutter blade disposed within said camera body;
e) means to advance said film in said camera; and
f) switching means for controlling said illuminating control circuit in response to the operation of said shutter blade, said switching means operative by means of one of mechanical advancement of said film and by mechanical movement of said shutter blade to operate said illumination control circuit to illuminate said film with light from said light source through said transmission hole with data on said print data plate data sections.

9. The non-removable-film camera of claim 8 wherein the illumination control circuit has a timed feeder circuit for fixing an amount of time that power is supplied to the light source by the closure of said switching means.

10. The non-removable-film camera of claim 9 wherein the data print unit has a battery for supplying power to the light source.

11. A non-removable-film camera having photographic film, comprising:
a) a data print unit comprising
A1) an assembled unit having an inner surface and an outer surface, said assembled unit comprising a lower frame having a light transmission hole, and an upper frame;
A2) a light source for emitting light and disposed within said assembled unit;

A3) at least one removable print data plate having multiple data sections at positions equidistant from its rotational center;

A4) at least one data indicator wheel having a flange with a plurality of data indicator sections corresponding to said data sections on said print data plate;

A5) an optical means that projects the light emitted from said light source through said light transmission hole;

A6) said data indicator means that projects the light emitted from said light source through said light transmission hole;

A7) said removable print data plate removably attached to said assembled unit so that each of said data sections are selectively aligned with said light transmission hole;

b) a camera body having a data light transmission hole formed therein, said data print unit detachably mounted to said camera body so that said camera body data light transmission hole is aligned with said assembled unit lower frame light transmission hole;

c) an illumination control circuit for control of said light source;

d) a shutter blade disposed within said camera body;

e) means to advance said film in said camera;

f) switching means for controlling said illuminating control circuit in response to the operation of said shutter blade, said switching means operative by means of advancement of said film or by operation of said shutter blade to operate said illumination control circuit to illuminate said film with light from said light source through said transmission hole with data on said print data plate data sections;

g) manual switching means for generating an illumination command signal that controls illumination by said light source;

h) detection means for detecting the completion of film advance and generating a detection signal;

i) means for determining the completed or uncompleted condition of film advance to a next film frame via said detection signal;

j) a timed feeder circuit for fixing an amount of time that power is supplied to said light source from a battery in said data print unit; and k) a double-illumination prevention circuit for prohibiting supply of power to said light source when said film advance is determined to be in an uncompleted condition via said detection signal.

12. The non-removable-film camera of claim 11, wherein said detection means comprises a switch that is sequentially opened and closed by a spring member that is moved into and out of perforation holes formed along an edge of said photographic film as said film is being advanced.

13. A non-removable-film camera having photographic film, comprising:

a) data print unit comprising

A1) an assembled unit having an inner surface and an outer surface, said assembled unit comprising a lower frame having a light transmission hole, and an upper frame;

A2) a light source for emitting light and disposed within said assembled unit;

A3) at least one removable print data plate having multiple data sections at positions equidistant from its rotational center;

A4) at least one data indicator wheel having a flange with a plurality of data indicator sections corresponding to said data sections on said print data plate;

A5) an optical means that projects the light emitted from said light source through said light transmission hole;

A6) said data indicator means that projects the light emitted from said light source through said light transmission hole;

A7) said removable print data plate removably attached to said assembled unit so that each of said data sections are selectively aligned with said light transmission hole;

b) a camera body having a data light transmission hole formed therein, said data print unit detachably mounted to said camera body so that said camera body data light transmission hole is aligned with said assembled unit lower frame light transmission hole;

c) an illumination control circuit for control of said light source;

d) a shutter blade disposed within said camera body;

e) means to advance said film in said camera; and f) switching means for controlling said illuminating control circuit in response to the operation of said shutter blade, said switching means operative by means of advancement of said film or by operation of said shutter blade to operate said illumination control circuit to illuminate said film with light from said light source through said transmission hole with data on said print data plate data sections, wherein said switching means comprises a photosensor in said data print unit and coupled to said illumination control circuit and positioned relative to said camera body to receive light via a light path in said camera body upon exposure of said film via said shutter blade, and a timed feeder circuit for fixing an amount of time that power is supplied to said light source from a battery in said data print unit when said photosensor detects light.

14. The non-removable-film camera of claim 13 wherein said light path includes a projected light path formed via perforation holes along an edge of said photographic film disposed within said camera.

15. The non-removable-film camera of claim 13 wherein said light path includes a transmission light hole formed at the back of said camera body and positioned within the angle of exposure of said photographic film.

16. The non-removable-film camera of claim 13 wherein said light path includes a dedicated light path for light detection outside a region conventionally occupied by said photographic film.

17. A removably attachable data store unit for a throwaway camera containing non-replaceable photographic film having film perforations along at least one edge of said film, said data store unit comprising:

a frame section having a first surface and a second surface opposite to said first surface;

a light source supported within said frame section, an optical path formed in said frame section between said light source and an exit hole in said first surface of said frame section for permitting light to exit therethrough upon illumination of said light source;

a light illumination circuit supported in said frame section and connected to operate said light source;

means to prepare said light illumination circuit to illuminate said light source upon operation of said camera;

at least one print data plate having multiple data sections rotatably positioned and detachably mounted on said first surface so that said data sections are selectively exposed within said optical path from said light source through said exit hole, said exit hole aligned with a corresponding hole in said camera when said data store unit is attached to said camera such that said aligned holes are exposed to a portion of said photographic film;

at least one data indicator wheel rotatably positioned on said second surface and coupled to said at least one print data plate to rotate the latter for selecting data sections to be selectively exposed within said optical path; and means operative on said light illumination circuit to illuminate said light source for a predetermined period of time to expose data from said data sections onto said photographic film, said means operative on said light illumination including a film winding determination means for determining whether the film has been wound, comprising:
  a switch in said data store unit for detecting the number of said film perforations passing said switch upon advance of said photographic film to a next, succeeding film frame, comprising:
    a conductive plate spring including a stationary member in electrical communication with a voltage source, a v-shaped member extending from said stationary member and biased against said photographic film to detect perforations therein as said photographic film moves with respect to said conductive plate spring; and
    a resettable counting means in intermittent electrical communication with said v-shaped conductive plate spring member of said Switch and responsive thereto for counting said detected film perforations and resetting once a predetermined number of said detected film perforations has been counted based on intermittently detecting said voltage source through said conductive plate spring.

18. A throw-away camera containing non-replaceable photographic film having film perforations along at least one edge of said film comprising:
  a camera body having a front surface with a lens and shutter for exposing a film frame of said photographic film advanced within said camera body and a back surface including a plurality of spaced apart retaining tabs extending outwardly therefrom;
  a data store unit removably attachable to said back surface of said camera body through pressure-fit frictional engagement therewith, comprising:
    a frame section having a first surface and a second surface opposite to said first surface, said frame section including a plurality of ear-shaped retaining members to receive said camera body retaining tabs when said data store unit is pressed against said back surface of said camera body;
    a light source supported within said frame section;
    an optical path formed in said frame section between said light source and an exit hole in said first surface of said frame section for permitting light to exit therethrough upon illumination of said light source;
    a light illumination circuit supported in said frame section and connected to operate said light source;
    means to prepare said light illumination circuit to illuminate said light source upon said film frame exposure;
    at least one print data plate having multiple data sections rotatably positioned and detachably mounted on said first surface so that said data sections are selectively exposed within said optical path from said light source through said exit hole, said exit hole aligned with a corresponding hole in said camera body back surface when said data store unit is attached to said camera body such that said aligned holes are exposed to a portion of said film frame;
    at least one data indicator wheel rotatably positioned on said second surface and coupled to said at least one print data plate to rotate the latter for selecting data sections to be selectively exposed within said optical path; and
    means operative on said light illumination circuit to illuminate said light source for a predetermined period of time to expose data from said data sections onto said film frame, said means operative on said light illumination circuit including a film winding determination means for determining whether the film has been wound, comprising:
      a switch in said data store unit for detecting the number of said film perforations passing said switch upon advance of said photographic film to a next, succeeding film frame, comprising:
        a conductive plate spring including a stationary member in electrical communication with a voltage source, a v-shaped member extending from said stationary member and biased against said photographic film to detect perforations therein as said photographic film moves with respect to said conductive plate spring; and
        a resettable counting means in intermittent electrical communication with said v-shaped conductive plate spring member of said switch and responsive thereto for counting said detected film perforations and resetting once a predetermined number of said detected film perforations has been counted based on intermittently detecting said voltage source through said conductive plate spring.

19. The throw-away camera of claim 18 wherein said means operative on said light illumination circuit comprises a switch located in said camera body electrically connected to said light illumination circuit and operated when a shutter in said camera is operated for exposure of a film frame of said photographic film.

20. The throw-away camera of claim 18 wherein said means operative on said light illumination circuit comprises a switch in said data store unit for detecting the number of said film perforations passing said switch upon advance of said photographic film to a next, succeeding film frame.

21. The throw-away camera of claim 20 wherein said switch is a mechanical device that extends from said first surface through an opening in said camera body back surface to engage and move in and out of said perforations upon film advance, and means in said circuit to count the number of perforations.

22. A data print unit comprising:
  a) an assembled unit having an inner surface and an outer surface, and comprising a lower frame having a light transmission hole, and an upper frame;
  b) a light source for emitting light and disposed within said assembled unit;
  c) an optical means that projects the light emitted from said light source through said light transmission hole;
  d) at least one print data plate having multiple data sections at positions equidistant from its rotational center, said print data plate removably attached to said unit so that each of said data sections are selectively aligned with said light transmission hole.

e) at least one data indicator wheel positioned on said outer surface of said assembled unit for rotation with respect to said assembled unit, comprising:
   e1) a flange including a plurality of data indicator sections corresponding to said data sections on said print data plate; and
   e2) a ratchet gear disposed on a surface of said data indicator wheel flange; and (f) a damping member, disposed on an upper frame of said assembled unit which meshes with said ratchet gear at a position near said light transmission hole.

23. The data print unit of claim 22, wherein an inclined surface is formed on a predetermined one of said ratchet gear or said damping member such that said inclined surface guides said upper frame and said data indicator wheel to a meshed condition during assembly.

24. A removably attachable data store unit for a throw-away camera containing non-replaceable photographic film having film perforations along at least one edge of said film, said data store unit comprising:

a frame section having a first surface and a second surface opposite to said first surface;

a light source supported within said frame section, an optical path formed in said frame section between said light source and an exit hole in said first surface of said frame section for permitting light to exit therethrough upon illumination of said light source;

a light illumination circuit supported in said frame section and connected to operate said light source;

means to prepare said light illumination circuit to illuminate said light source upon operation of said camera;

at least one print data plate having multiple data sections rotatably positioned and detachably mounted on said first surface so that said data sections are selectively exposed within said optical path from said light source through said exit hole, said exit hole aligned with a corresponding hole in said camera when said data store unit is attached to said camera such that said aligned holes are exposed to a portion of said photographic film;

at least one data indicator wheel rotatably positioned on said second surface and coupled to said at least one print data plate to rotate the latter for selecting data sections to be selectively exposed within said optical path; and means operative on said light illumination circuit to illuminate said light source for a predetermined period of time to expose data from said data sections onto said photographic film, comprising a photosensor electrically connected to said light illumination circuit and operated upon receipt of light when a shutter in said camera is operated for exposure of a film frame of said photographic film.

25. A throw-away camera containing non-replaceable photographic film having film perforations along at least one edge of said film comprising:

a camera body having a front surface with a lens and shutter for exposing a film frame of said photographic film advanced within said camera body;

a data store unit removably attachable to a back surface of said camera body;

said data store unit comprising:

a frame section having a first surface and a second surface opposite to said first surface;

a light source supported within said frame section;

an optical path formed in said frame section between said light source and an exit hole in said first surface of said frame section for permitting light to exit therethrough upon illumination of said light source;

a light illumination circuit supported in said frame section and connected to operate said light source;

means to prepare said light illumination circuit to illuminate said light source upon said film frame exposure;

at least one print data plate having multiple data sections rotatably positioned and detachably mounted on said first surface so that said data sections are selectively exposed within said optical path from said light source through said exit hole, said exit hole aligned with a corresponding hole in said camera body back surface when said data store unit is attached to said camera body such that said aligned holes are exposed to a portion of said film frame;

at least one data indicator wheel rotatably positioned on said second surface and coupled to said at least one print data plate to rotate the latter for selecting data sections to be selectively exposed within said optical path; and means operative on said light illumination circuit to illuminate said light source for a predetermined period of time to expose data from said data sections onto said film frame, comprising a photosensor electrically connected to said light illumination circuit and operated upon receipt of light when a shutter in said camera is operated for exposure of a film frame of said photographic film.

* * * * *